US012469383B2

(12) United States Patent
Smaga et al.

(10) Patent No.: US 12,469,383 B2
(45) Date of Patent: Nov. 11, 2025

(54) MODULAR MONITOR CONTROL SYSTEM

(71) Applicant: Task Force Tips LLC, Valparaiso, IN (US)

(72) Inventors: Ryan D. Smaga, Valparaiso, IN (US); Jeremy D. Kaiser, Hebron, IN (US); Kent A. Kekeis, St. John, IN (US); Travis E. Bavar, LaPorte, IN (US)

(73) Assignee: Task Force Tips LLC, Valparaiso, IN (US)

(*) Notice: Subject to any disclaimer, the term of this patent is extended or adjusted under 35 U.S.C. 154(b) by 0 days.

(21) Appl. No.: 18/543,329

(22) Filed: Dec. 18, 2023

(65) Prior Publication Data

US 2024/0203242 A1 Jun. 20, 2024

Related U.S. Application Data

(60) Provisional application No. 63/433,511, filed on Dec. 19, 2022.

(51) Int. Cl.
*G08C 17/02* (2006.01)

(52) U.S. Cl.
CPC ......... *G08C 17/02* (2013.01); *G08C 2201/42* (2013.01)

(58) Field of Classification Search
CPC .... G08C 17/02; G08C 2201/42; A62C 37/00; A62C 37/08; A62C 37/38; A62C 37/40; A62C 37/50; A62C 31/28; A62C 35/68
See application file for complete search history.

(56) References Cited

U.S. PATENT DOCUMENTS

| | | | | |
|---|---|---|---|---|
| 9,272,171 | B2 | 3/2016 | Kolacz et al. | |
| 9,399,151 | B1 * | 7/2016 | Combs | G06F 3/0488 |
| 2009/0101368 | A1 * | 4/2009 | Lozier | A62C 31/28 169/56 |
| 2012/0126155 | A1 | 5/2012 | Kolacz et al. | |
| 2014/0094976 | A1 | 4/2014 | Lozier et al. | |
| 2014/0118998 | A1 * | 5/2014 | Mabry | F21V 21/00 362/184 |
| 2017/0348557 | A1 | 12/2017 | Pohl et al. | |
| 2019/0160316 | A1 | 5/2019 | Counts et al. | |
| 2019/0262642 | A1 * | 8/2019 | Petit | A62C 31/24 |
| 2021/0308510 | A1 | 10/2021 | Prahl et al. | |
| 2022/0219031 | A1 * | 7/2022 | Prat | G08B 21/182 |
| 2022/0407174 | A1 * | 12/2022 | Sandahl | H01M 50/249 |

OTHER PUBLICATIONS

International Search Report and Written Opinion filed in PCT/US2023/084735; dated Apr. 26, 2024; 11 pages.

* cited by examiner

*Primary Examiner* — Adnan Aziz
(74) *Attorney, Agent, or Firm* — Vedder Price P.C.

(57) ABSTRACT

A firefighting apparatus and system for operating firefighting monitors and devices includes a base or hub that can be installed on the monitors and devices. Additionally, one of a plurality of external modules may be added to the hub. This apparatus and system allows for a simple and streamlined manufacturing and assembly process. Further, additional or different functionality may be easily added or removed from the system later in time.

18 Claims, 23 Drawing Sheets

MODULAR MONITOR CONTROL SYSTEM

RELATED APPLICATION AND INCORPORATION BY REFERENCE

This application claims benefit of and priority to U.S. Provisional Patent Application Ser. No. 63/433,511, filed Dec. 19, 2022, the content of which is hereby incorporated by reference.

FIELD OF DISCLOSURE

The present disclosure generally relates to a fire control system, and more particularly to a fire control system comprising a plurality of functional modules that mount directly to a hub of a fire control monitor, a fire control vehicle or a handheld fire control device.

BACKGROUND

Firefighters extinguish fires with fire control systems called monitors. The monitors are arranged to direct fluids in any range of desired trajectories. Monitors generally include flow path designs and mechanical and electrical mechanisms that enable firefighters to adjust the trajectory easily and with little force.

Fire control monitors with a wide variety of configurations have been developed over the course of time. These configurations include combinations of a wide variety of different structural elements that provide adjustability of the trajectory in combination with various mechanisms for firefighters to use to adjust the monitor to a particular trajectory or direction.

Electric monitors today generally have electrical and electronic components disposed on or adjacent to the fire control monitor. This allows for very little or difficult upgrading or addition of supplemental functionality. For one example, the addition of wireless remote control capability to a firefighting monitor is a difficult task.

In order to wirelessly control a monitor remotely, a handheld control device having an antenna must communicate with a transceiver unit that relays the commands from the handheld control device to the monitor. This transceiver unit needs to be connected, physically or electrically, to the monitor. Currently, there are three ways that this transceiver is connected to the monitor.

The first method is to permanently fix the transceiver to the monitor itself. An example is the Akron Stream Master II. Monitors using this method have the transceiver and antenna that are incorporated on the monitor. This is the simplest method to add a transceiver to the monitor. However, there are drawbacks from a manufacturing and cost standpoint. Many times, the same model monitor is used both with and without wireless remote control capabilities. If every monitor is built with a transceiver, there is extra cost added into all the other models that do not require wireless remote control. Additionally, the transceiver and antenna are permanently affixed to the position on the monitor and cannot be relocated and retain functionality.

The second method is to make the transceiver a separate component that is located near the monitor. This example can be seen on the Elkhart Cobra. This transceiver is mounted in a sealed box that is disposed near the monitor and then connected to the monitor by a cable. However, this method is problematic from a practical perspective. For instance, it is often difficult to find a proper location to mount the transceiver in the hazardous environment in which it is required to operate. In particular, there are increased difficulties in spaces with limited availability, such as the end of a firetruck ladder. When there is limited availability to mount the transceiver immediately next to the monitor, the transceiver is usually mounted on a metal plate, which interferes with the range and signal of wireless communication. Additionally, the transceiver box is permanently affixed to the desired position and cannot be relocated and retain functionality.

The third method is to convert the transceiver antenna into an upgradable component that can be added to the monitor, namely a sealed box that includes the transceiver antenna. This example can be seen in Task Force Tips Remote Control Monitors. This method has the benefit of mounting the transceiver box on the monitor for a clear signal and reduces the cost of producing monitors (since not every monitor will require a transceiver box). The drawbacks of this method are that the current transceivers consist of multiple parts and the monitor must be partially disassembled in order to add the transceiver. Disassembly and reassembly increases the risk of improper installation or accidental damage to the monitor as well as exposing the previously sealed electronics to the outside environment. Additionally, for each of the methods described above, wireless control of the monitor requires a wireless controller. The wireless controller contains many of the same components as the receiver/transceiver which is mounted proximate to the monitor. It would be beneficial from a manufacturing and cost perspective if both units were identical, so that the same assembly could be used in multiple configurations.

A long felt, but unmet, need exists for a systematic strategy for mounting an integral, sealed single-piece transceiver unit (and other functional modules) directly to a monitor via a standardized and reproducible interface that allows for easy installation and removal not only to the monitor, but also to other locations, such as, but not limited to a panel of the fire truck, a handheld device, other firefighting devices, etc.

SUMMARY OF DISCLOSURE

This summary is provided to introduce a selection of concepts in a simplified form further described in the detailed description of the disclosure. This summary is not intended to identify key or essential inventive concepts of the claimed subject matter, nor is it intended for determining the scope of the claimed subject matter.

The present disclosure generally describes a device, assembly and/or system that facilitates mounting of a at least one functional module directly to a hub on a fire control monitor or other firefighting device.

The present disclosure introduces a module that mounts directly to a hub on the monitor via an interface that allows for easy installation. In particular, the disclosure provides a way to easily add control and/or wireless control functionality to the monitor. The standardized mounting connection keeps costs of manufacturing low where wireless capability is not required and provides a clear communication signal, and for simple and easy installation.

The monitor base comprises an interface that allows for the addition of one or more external modular components each of which may have different functionality. These modular components serve as upgrade packages and attachments for the monitor.

The monitor may include a central electronics controller (referred to as a hub). The hub serves as a communication and distribution center for all the electrics and electronics on the monitor. The hub also contains an interface to receive one or more externally mounted modular component accessories. These modular components consist of wireless remote capabilities, onboard user controls, lighting indicators, battery pack and other components.

The system allows for a common base control system to be installed on all monitors. When a specific upgrade or feature is needed, an external module may be added to the monitor. This system allows for a simple and streamlined manufacturing and assembly process. In addition, the system serves as an easier way to upgrade a monitor with a feature later in time.

BRIEF DESCRIPTION OF DRAWINGS

The accompanying drawings incorporated in and forming a part of the specification illustrate several aspects of the present disclosure and, together with the description, serve to explain the principles of the embodiments. In the drawings.

DETAILED DESCRIPTION

Figure 1:
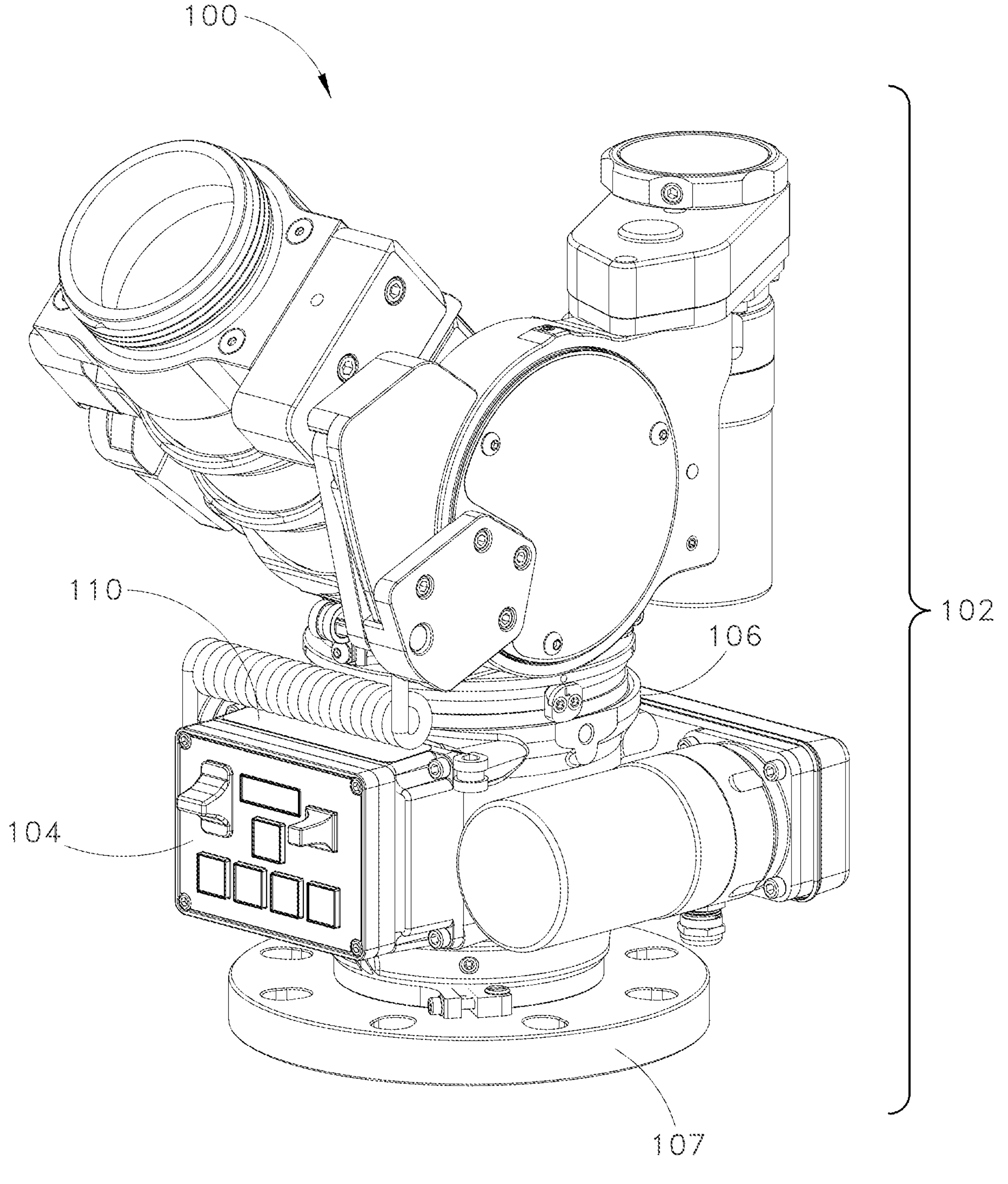
FIG. 1 depicts a perspective view of a monitor system consisting of the monitor and hub.
Figure 2:
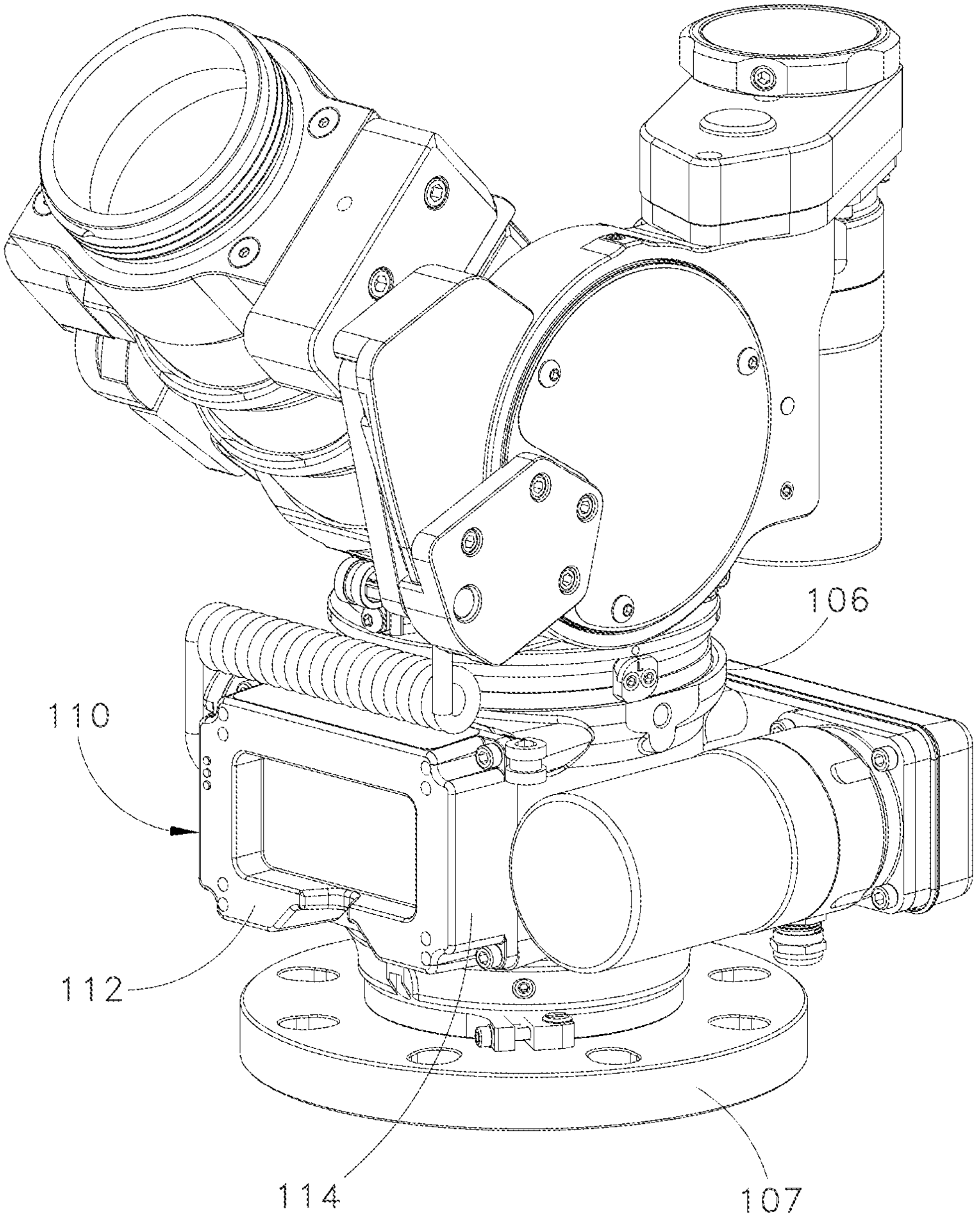
FIG. 2 depicts a perspective view of the hub as shown in FIG. 1.

This disclosure as a whole may be best understood by reference to the following detailed description when read in conjunction with the accompanying drawings, descriptions, abstract, background, field of disclosure and associated headings. Identical reference numbers when found on different drawings identify the same elements or a functionally equivalent element. The elements listed in the abstract are not referenced but nevertheless refer by association to the elements of the detailed description and associated disclosure.

The modular monitor control system 100 comprises a monitor 102 or other firefighting device and at least one module 104. The modular monitor control system 100 further comprises a hub 110 which provides a connection for the addition of modules 104. Module 104 references a generic module. Specific modules such as the controller interface module 200 and wireless control transmitter 300 are described below.

The Monitor

A firefighting monitor, commonly referred to as a monitor, is generally comprised of structural components and configurations and functionality known to a person having ordinary skill in the firefighting equipment art. Several monitor embodiments are shown in U.S. Pat. No. 9,272,171 (the "'171 patent"), such as fixed monitors capable of rotating about a central axis on a fluid inlet, the fluid inlet receiving fluid from a fixed base and whereby the fluid inlet forms a rotary union with the fixed base in order to aim the discharge trajectory of the monitor through rotation. All of the monitor designs disclosed in the '171 patent and all other disclosures of the '171 patent are hereby incorporated by reference.

The present disclosure improves upon the previous models of monitors. In particular, the prior art monitors each include external control boxes installed near the monitor and the external control boxes offer limited to no protection for electrical components in wet, hazardous and/or dangerous conditions. In addition, this present disclosure is not exclusive to the monitor design disclosed in the '171 patent, which is cited and incorporated solely to aid in description of the environment and inventive aspects, but rather, the present disclosure is applicable to any monitor design.

Figure 21:
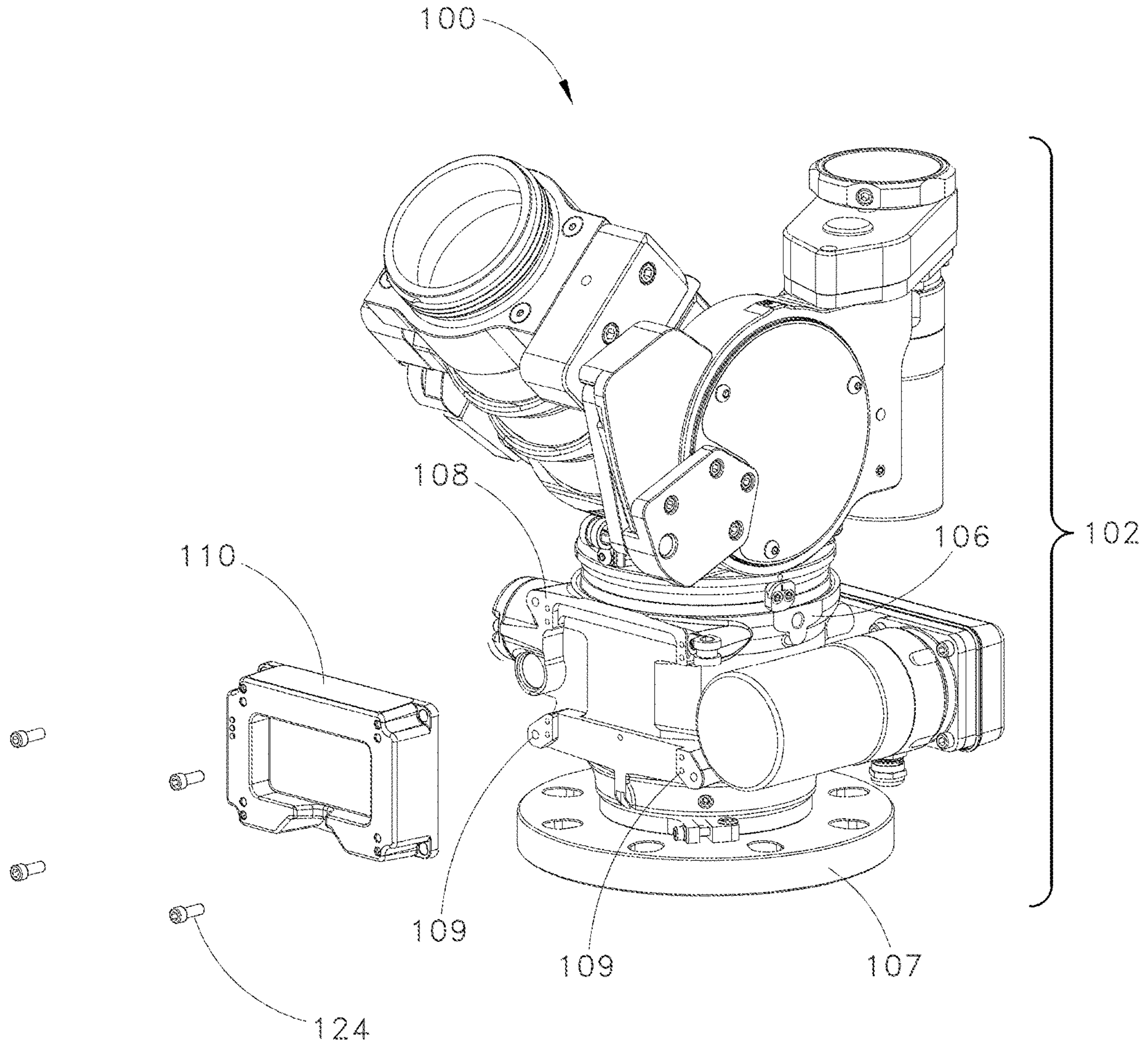
FIG. 21 depicts an exploded view of the monitor system of FIG. 1.
Figure 22:
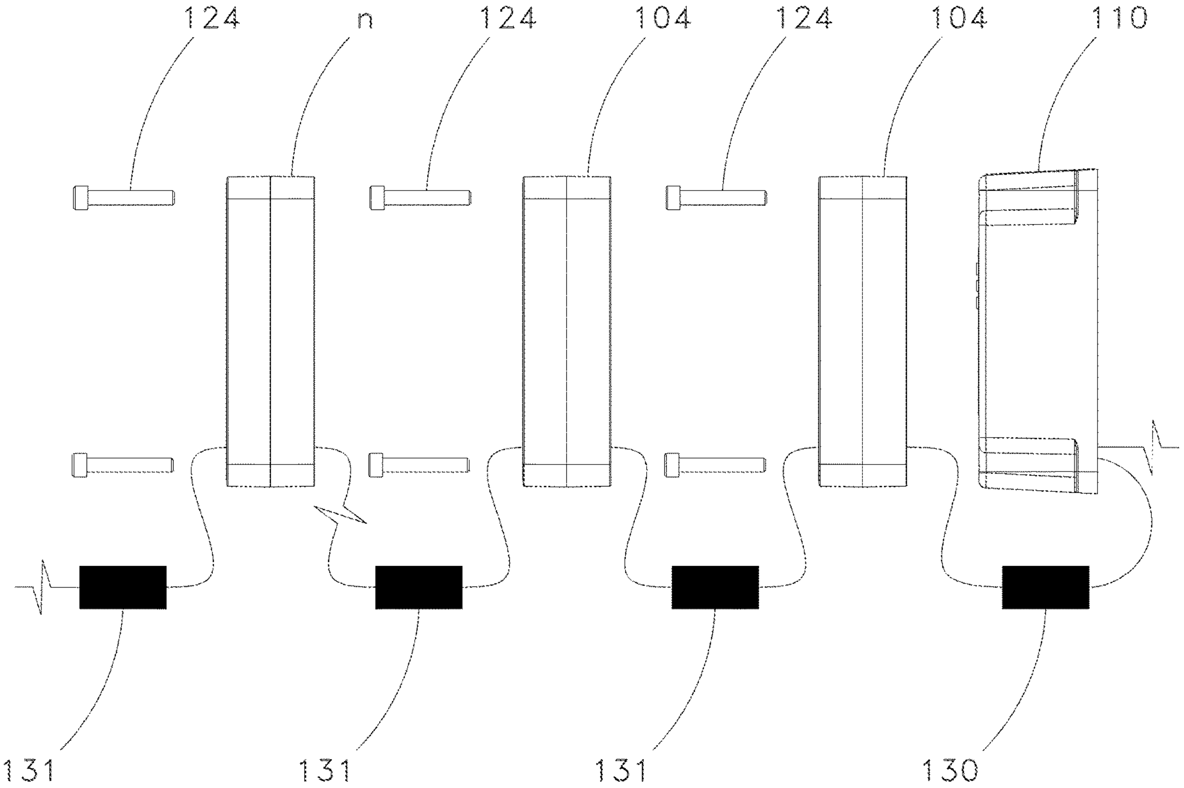
FIG. 22 depicts an exploded side view of one embodiment of a plurality of modules for connection to the hub.

As shown in FIG. 21, the monitor 102 of the present disclosure may include a base having a mounting connection 107, a conduit 106, and an interface flange 108, wherein the interface flange 108 is disposed on the conduit 106. It is within the teachings of this disclosure that the mounting connection 107 may be configured as a bolted flange (as shown) or a threaded connection with equal effect. One of ordinary skill in the art will recognize that the configuration of the mounting connection 107 will be dependent on the desired installation. The interface flange 108 may be formed integral with or connected to the conduit 106. The interface flange 108 may include a continuous surface about a perimeter of an area or volume or a plurality of discrete surfaces that stand proud of a lower surface of the interface flange 108 to define a boss. The discrete surfaces may define a cavity or passageway between the hub 110 and the conduit 106 that may be beneficial to route wires, cables, other similarly shaped objects, etc. As shown in FIG. 21, a plurality of mounting points 109 may be formed or defined in the surface of the interface flange 108 to facilitate connection of the hub 110 and various modules 104. For example, the mounting point may be a threaded bore, a smooth bore, a projection, or other suitable structural components to facilitate the intended functionality. The mounting points 109 may be disposed to define mounting patterns. One mounting pattern may be useful to connect the hub 110 to the interface flange 108. Another mounting pattern may be useful to connect a module 104 to the interface flange. In one embodiment, threaded fasteners 124 may be used to connect the hub 110 and/or a module 104 to the interface flange 108.

The Hub

As shown in FIGS. 1-5, 10-15 and 21, the monitor 102 may include a hub 110. In one preferred embodiment, the hub 110 may be formed separately from the base of the monitor 102 and is connectable to the interface flange 108 of the base of the monitor 102, preferably by threaded fasteners 124. In an alternative embodiment, the hub 110 may be integrally formed within the interface flange 108 of the base of the monitor 102. The material of construction of the hub 110 may be of the same or different material as the interface flange 108 of the monitor 102. Preferably, the base of the monitor 102 is made of a metal or similar material in order to achieve the intended functionality. The separately formed hub 110 may be formed from any suitable natural, synthetic or man-made material, such as for example, plastic, nylon or other material that provides the intended functionality. The hub 110 facilitates connection of controls of the monitor 102 as well as additional functional modules 104.

As shown in FIGS. 2-6, the hub 110 may include a front side 112 which may be, in one preferred embodiment, generally rectangular in shape and a perimeter wall 114 which extends from the edges of the front side 112. The edges of the wall 114 opposite the front side 112 form the interface surface 116 of the hub 110. The interface surface 116 and an inner surface of the perimeter wall 114 defines a rear cavity 115. The perimeter wall 114 adjacent the interface surface 116 may include apertures 150 for connecting the hub 110 to the monitor 102 as described herein. In the embodiment depicted in FIG. 6, there are a plurality of spaced apart apertures 150 that are arranged in a mounting pattern to align with similarly situated mounting points 109 on the interface flange 108 of the base of the monitor 102. In the preferred embodiment, a plurality of threaded fasteners 124 inserted through the apertures 150 may be used to secure the hub 110 to the mounting points 109 of the interface flange 108 of the monitor 102. In alternative embodiments, the hub 110 may be secured to the monitor 102 by other suitable mechanical connections, such as, a stud and nut combination, a push-lock connection or any other mechanical connection that will provide the intended functionality.

Figure 3:
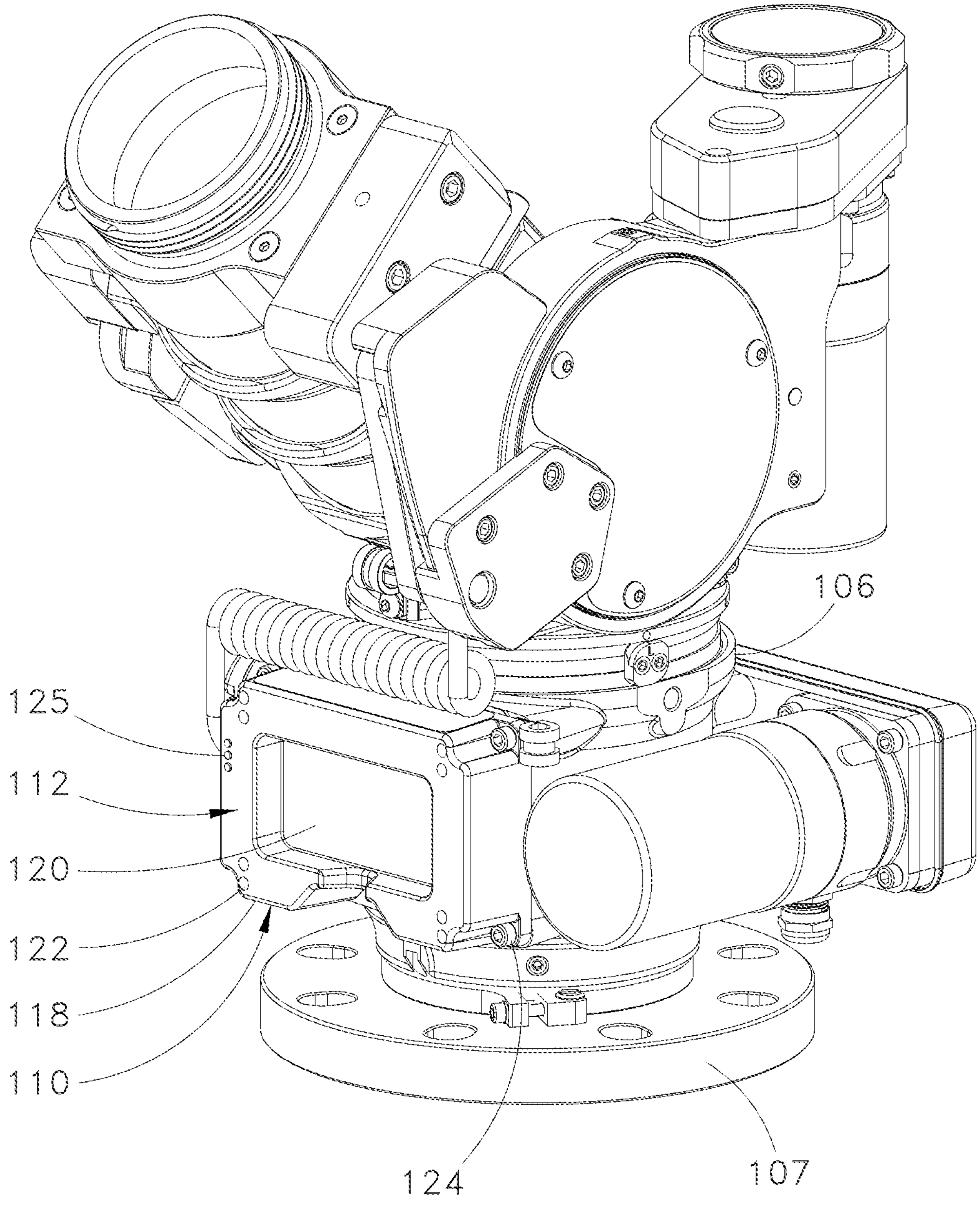
FIG. 3 depicts a second perspective view of the hub as shown in FIG. 1.

As shown in FIG. 3, the front side 112 of the hub 110 comprises a front surface 118 and an interiorly disposed recessed surface 120 connected to the front surface 118 by an interior wall. The front surface 118 extends from an outer edge to an inner edge which is co-located with the top edge of the interior wall. The recessed surface 120 is disposed within the interior wall. The inner edge of the front surface 118, the interior wall and the recessed surface 120 cooperatively define a front cavity.

The top surface 112 of the hub 110 further may include a mounting point 122 that is similarly configured as the mounting point 109 and useful to connect to various modules 104. In one preferred embodiment shown in FIG. 3, the front surface 118 comprises a plurality of mounting points 122, which may be disposed in a plurality of mounting patterns. Threaded fasteners 124 are configured to engage the mounting points 122 to secure the modules to the hub 110. The hub 110 further comprises inserts which allow for additional inputs and controls.

A notch 140 may be formed in the front surface 118 and perimeter wall 114 of the hub 110. In an embodiment, the notch 140 may be parabolic in shape, having a closed end disposed proximate the recessed surface 120 and an open end disposed adjacent the front surface 118. In the preferred embodiment, the notch 140 is disposed along the lower portion of the hub 110 adjacent the mounting connection 107 of the monitor 102. The notch 140 is configured to provide an entry way to the front cavity to store cords, cables, and other electronic components.

Figure 4:
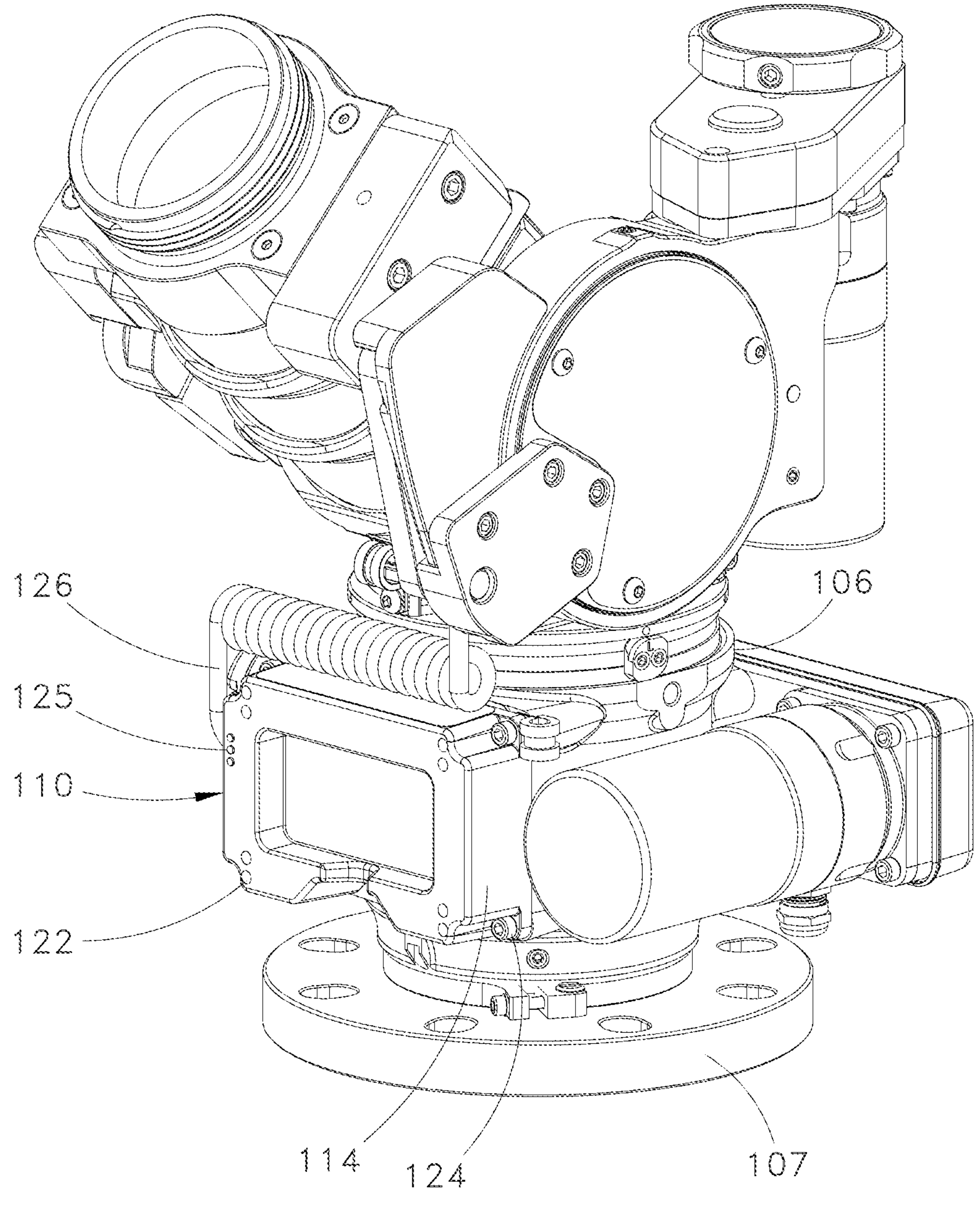
FIG. 4 depicts a perspective view of a hub and motor and sensor cables used to control the position of the monitor.
Figure 5:
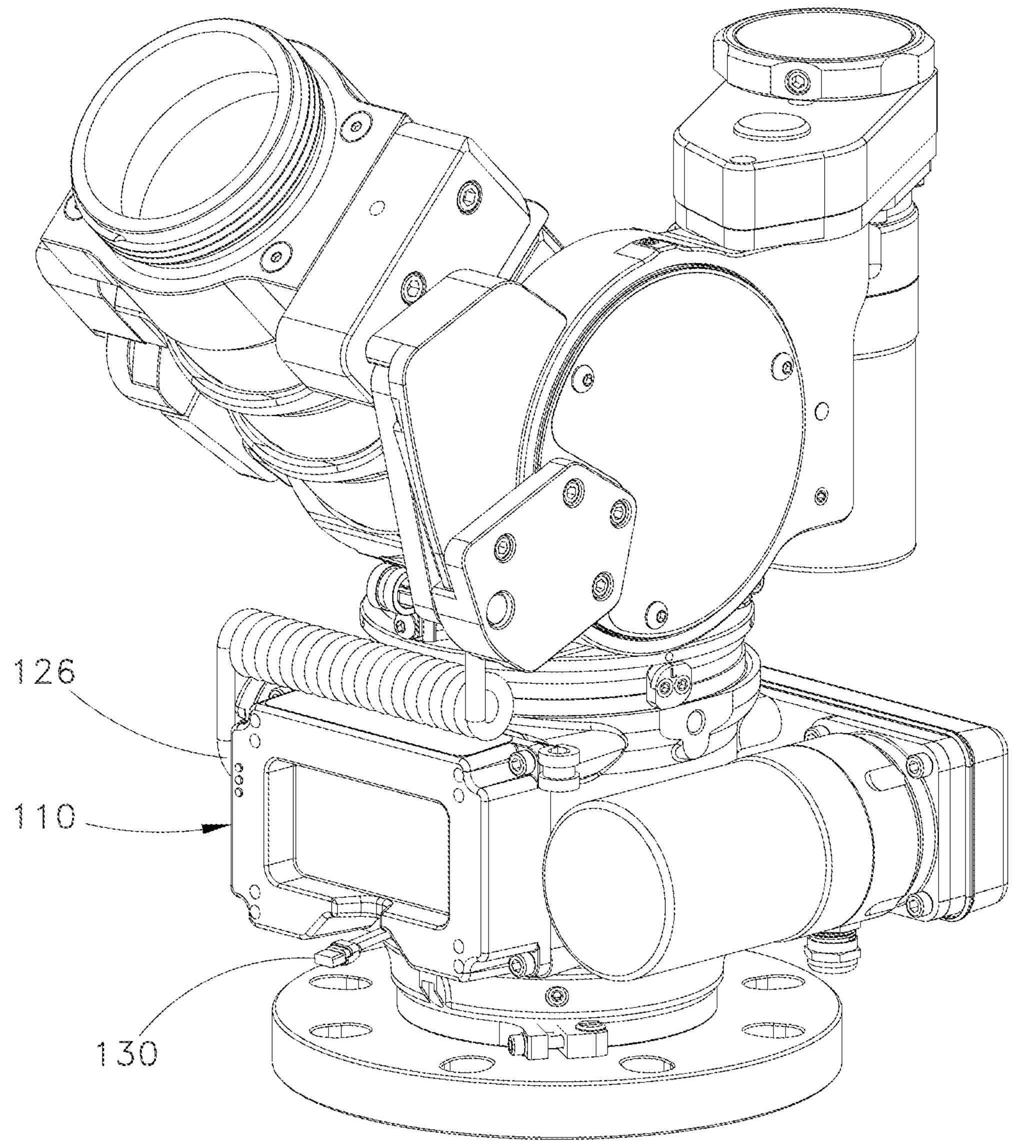
FIG. 5 depicts a perspective view of the hub and connection for modules that nest in the cavity of the hub.
Figure 6:
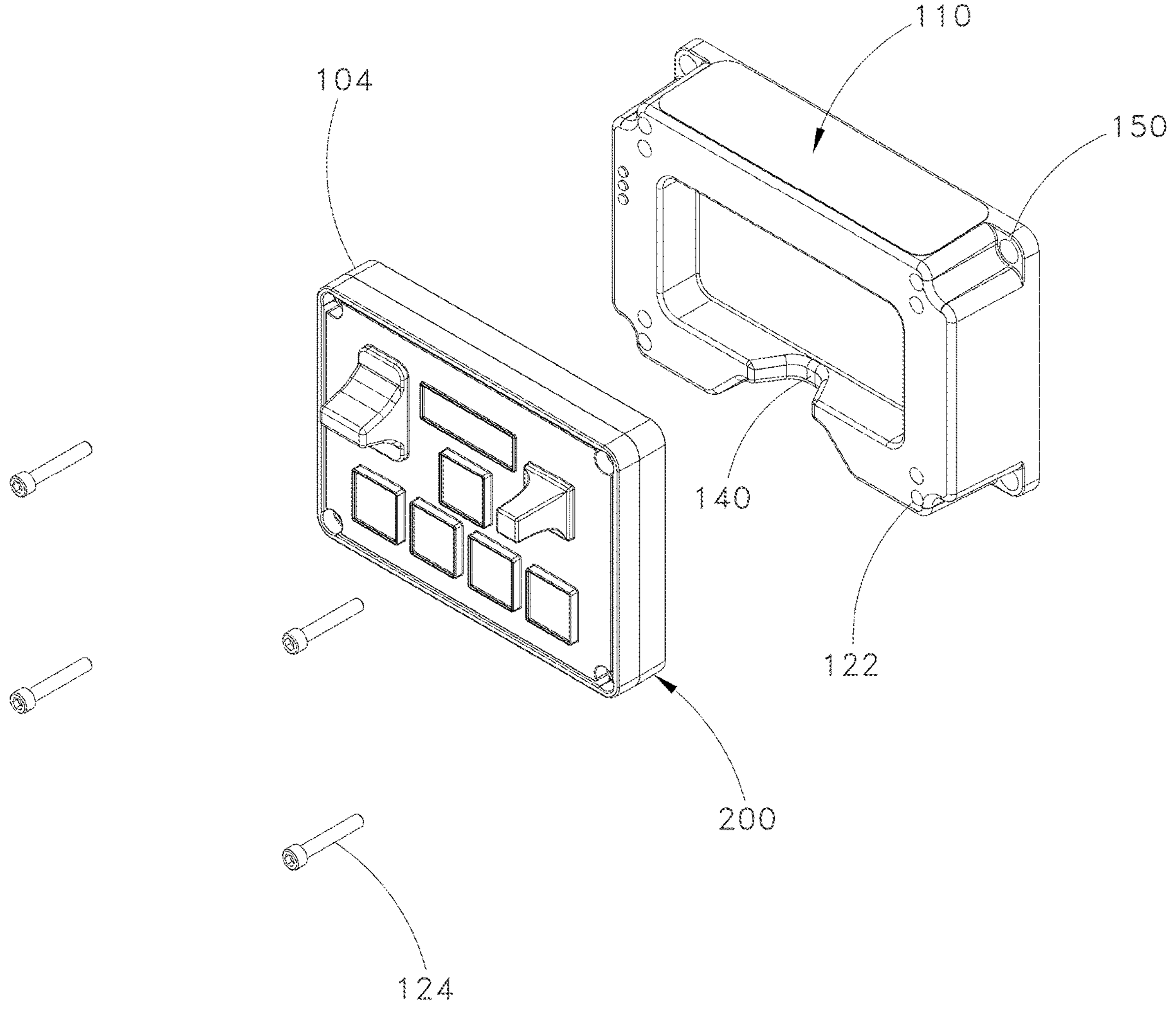
FIG. 6 depicts an exploded view of a connection between a module and the hub.
Figure 7:
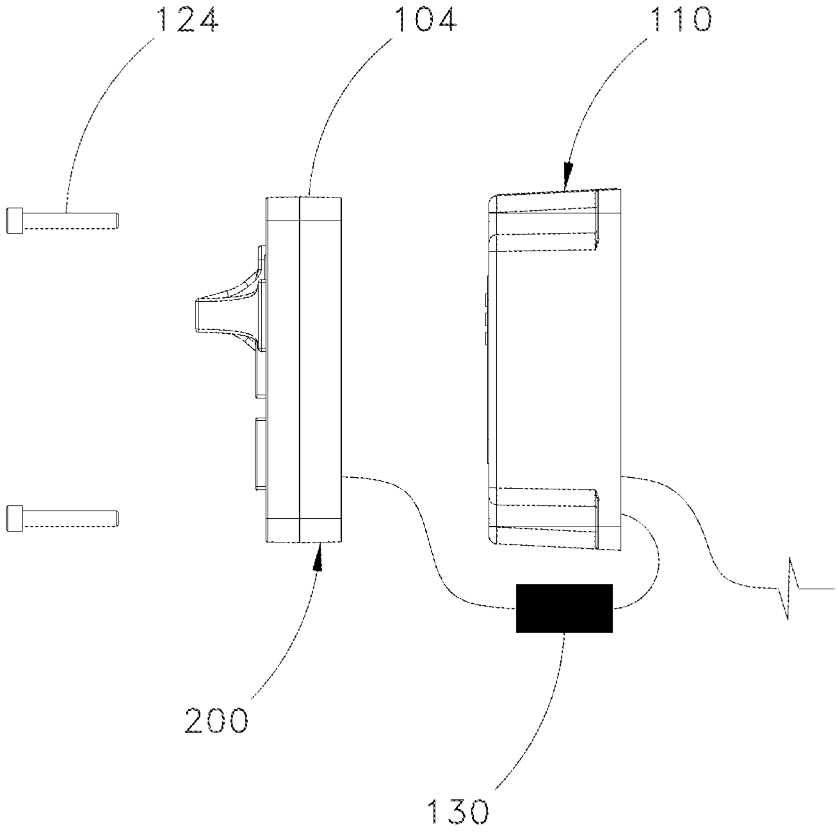
FIG. 7 depicts a second exploded view of a connection between the module and hub shown in FIG. 6
Figure 13:
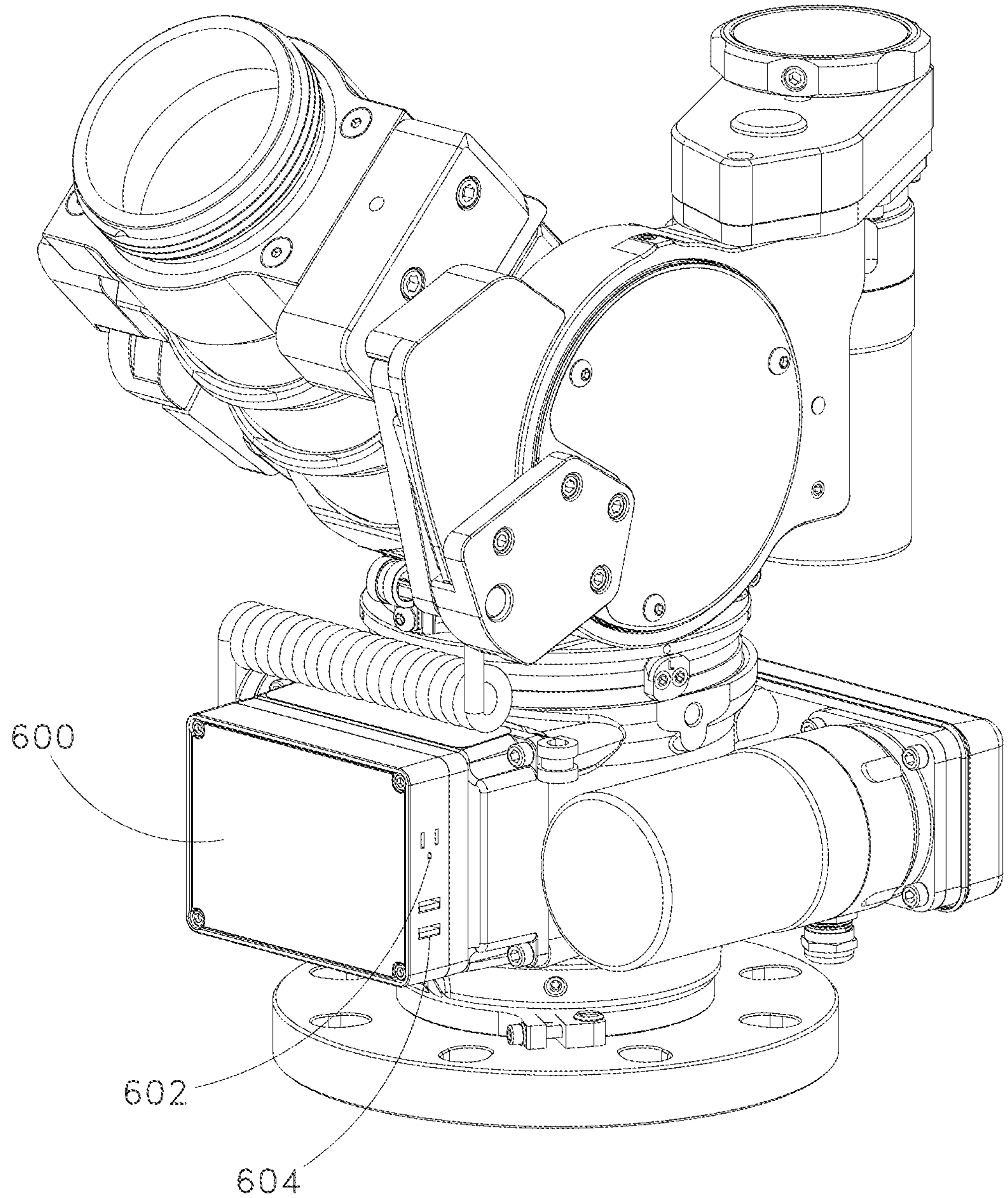
FIG. 13 depicts a connection between a power module and the hub.
Figure 14:
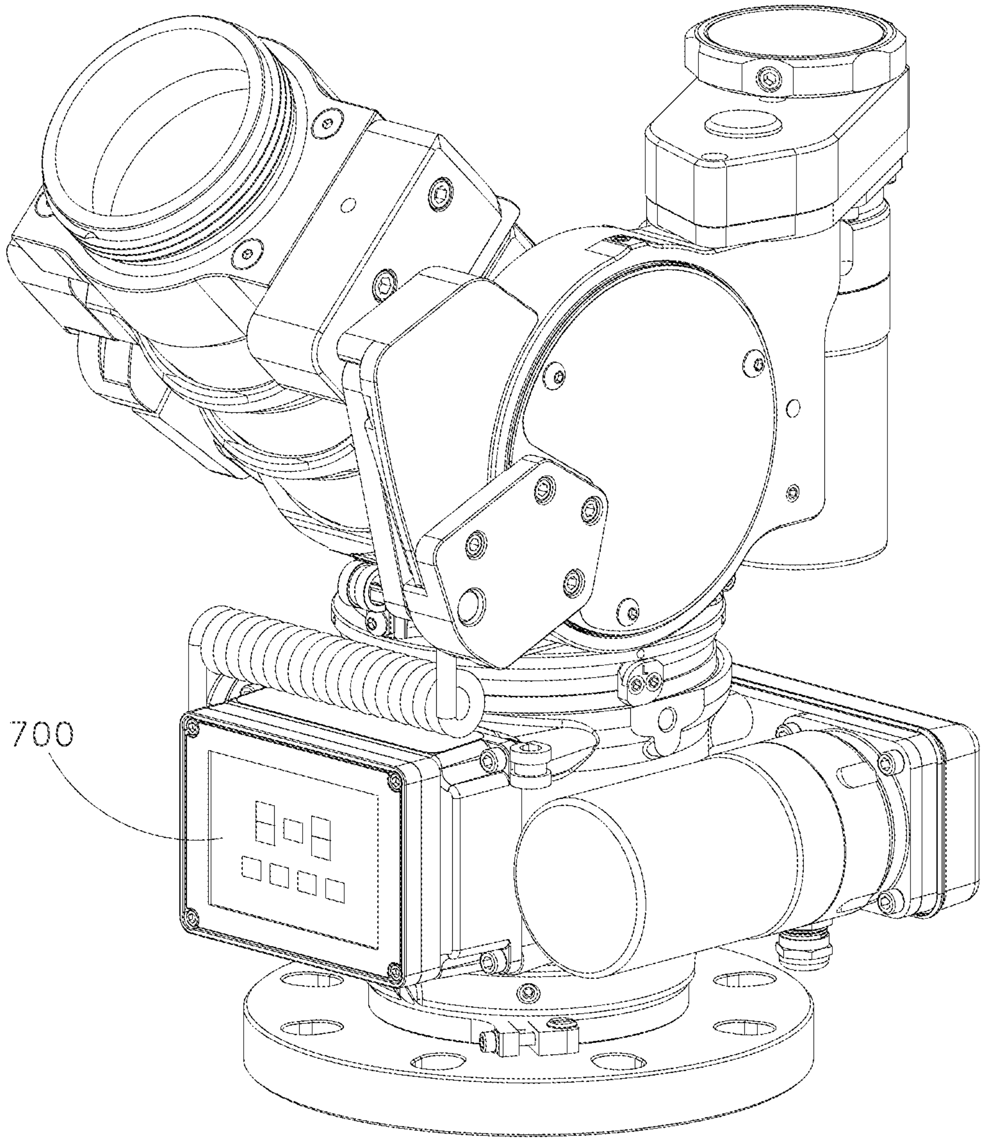
FIG. 14 depicts a connection between a screen display module and the hub.
Figure 15:
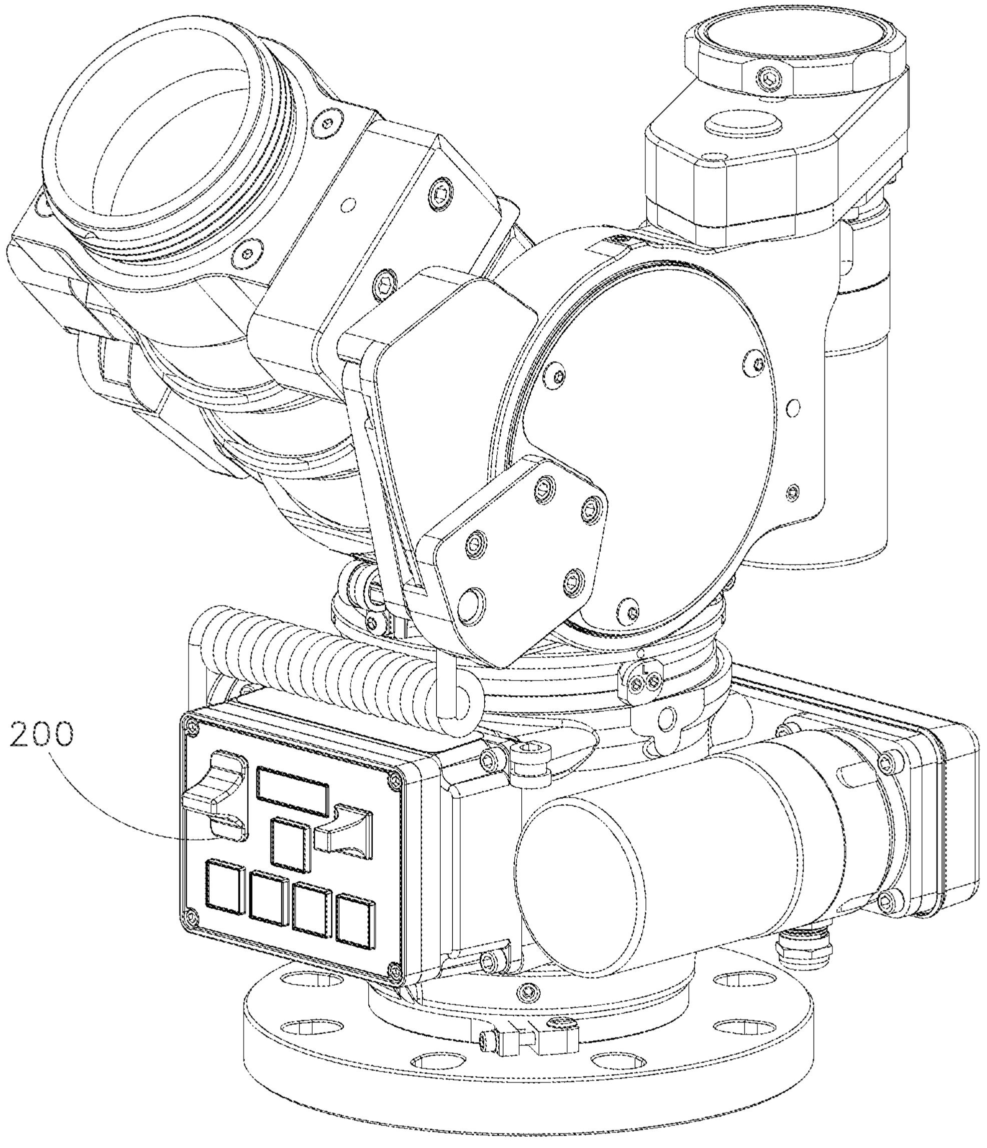
FIG. 15 depicts a connection between a controller interface module and the hub.
Figure 23:
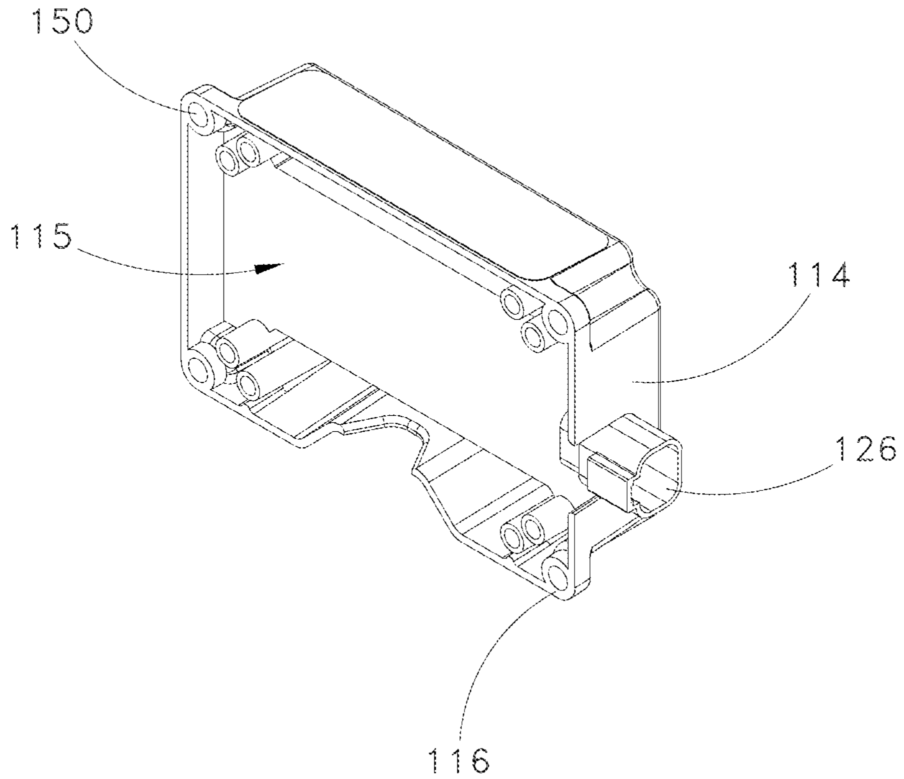
FIG. 23 depicts a rear perspective view of the hub.

The hub may also include a LED light 125, to display status and communicate different status conditions such as power level, error, battery life and the like. In one embodiment, a plurality of LED lights 125 are disposed on the front surface 118. It will be recognized that the LED lights 125 may also be disposed on the perimeter wall 114, As shown in FIGS. 4, 13 and 23, the hub 110 may additionally include socket ports and connections 126, 602, 604 located along the sides of the hub 110. The connections receive input power and communications, and distribute them to the monitor's actuators and sensors.

Figure 8:
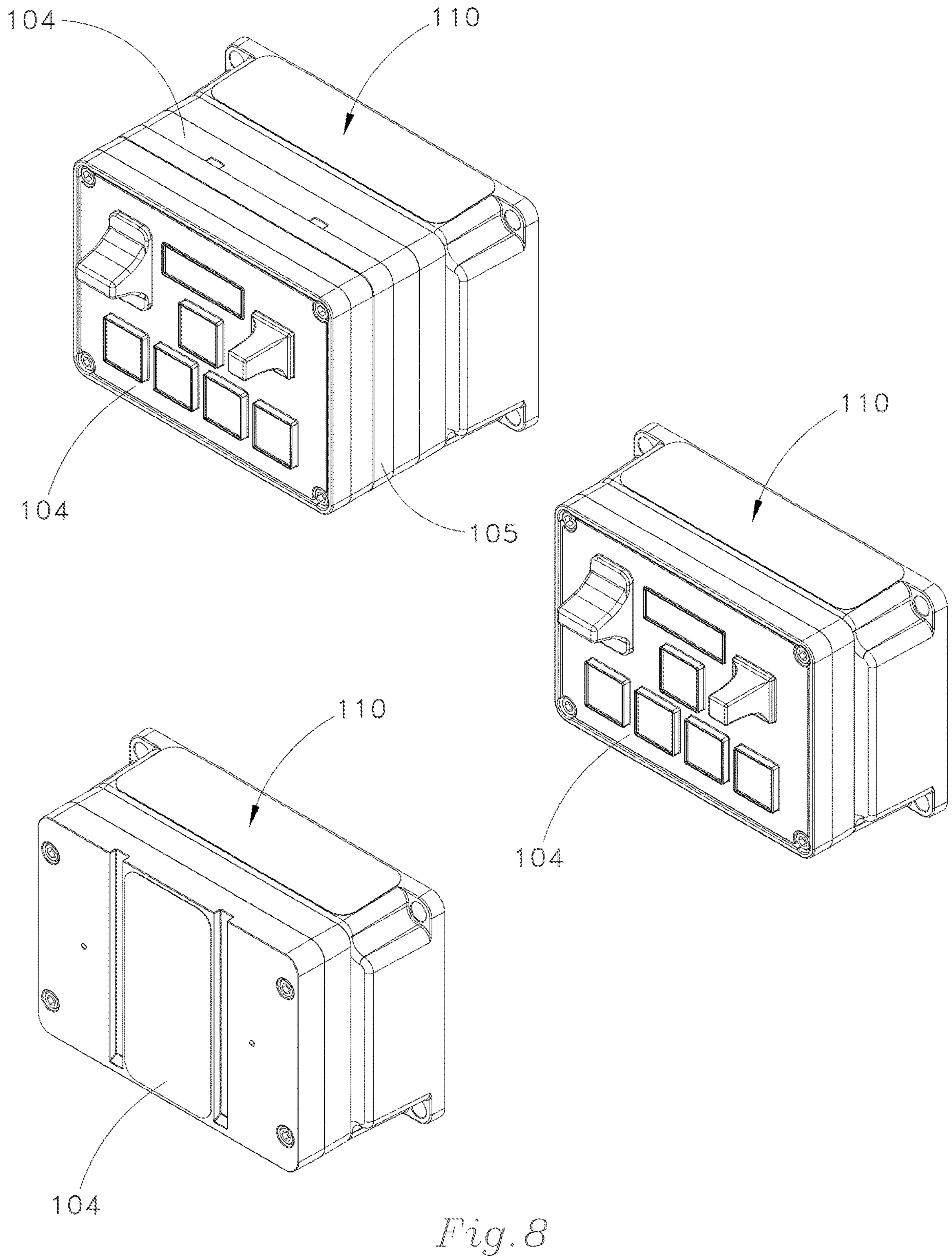
FIG. 8 depicts a perspective view of modules in connection with the hub.
Figure 9:
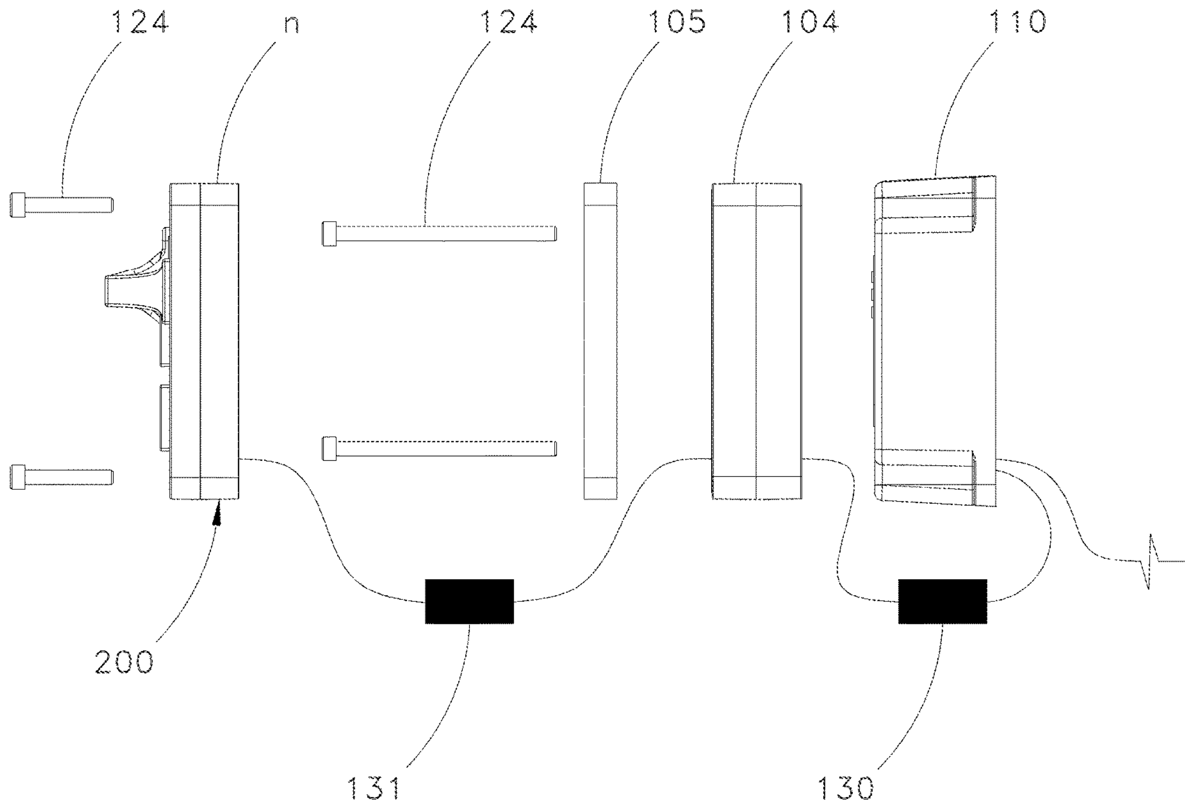
FIG. 9 depicts an exploded side view of a connection between two modules and the hub.

As shown in FIGS. 5, 7, 9, and 22, the front cavity within the hub 110 is configured to house the wires and connectors 130 between the modules. In one preferred embodiment, each module 104 may include a cable with a connector 130. In the preferred embodiment, the cable 130 operatively connects the first module 104 to the hub 110 where the connector 130 and cables are disposed within the front cavity of the hub 110. As shown in FIG. 9, each module 104 includes an additional cable and connector 131 to operatively connect additional modules. In some cases, the design of a module 104 may not provide adequate room for cable routings like the front cavity in the hub 110. As shown in FIG. 8 and FIG. 9, a module spacer plate 105 can be used between adjacent modules 104 when additional space is needed for proper cable and connection routings. The module spacer plate 105 contains an open cavity similar to the front of the hub 110 to achieve the same function but between different adjacent modules.

The hub 110 and modules 104 may be formed from any natural or man-made material, including but not limited to plastics and metal alloys. In a preferred embodiment the hub 110 and modules 104 are constructed of a plastic material. Plastic is advantageous as it provides a lightweight frame, is cost effective and allows wireless signals (such as radio waves) to pass through the hub 110. A UV stable plastic is particularly advantageous as the hub 110 is generally placed in an outdoor environment. In an alternative embodiment, the hub 110 and modules may be constructed out of a metal alloy for additional strength or support. In the preferred embodiment, the hub 110 is configured to communicate by means of any wireless signal, including but not limited to Wi-Fi, Zigbee, Bluetooth, or other wireless communication means. As such, plastic compositions made for EMF shielding are not preferred for the hub 110 and modules 104.

In addition to a monitor 102, the hub 110 and associated modules 104 may be used to operate other firefighting devices (including but not limited to valves, nozzles, or other firefighting devices where control or interface is necessary or desirable). Instead of the monitor 102, the hub 110 and modules 104 may be fitted to valves, nozzles, or other firefighting equipment by incorporating a mounting location for the hub 110 on the other firefighting equipment, substantially as described herein. The module 104 and hub 110 would interact with the other firefighting equipment similarly as to how the hub 110 and module 104 would interact with the monitor 102. The only material difference is the firefighting device to which the hub 110 and modules 104 are mounted. The hub 110 and modules 104 themselves would enable a user to carry out the various functions that there may be for other firefighting devices via direct or indirect engagement. For instance, the hub 110 and module 104 may be used to control a valve of a hydrant, the aperture of a nozzle, or any other desired functionality.

Modules

As shown in FIGS. 1, and 6-15, system 100 may comprise several different modules 104 that may be connected to the hub 110 and provide controls and other features for the monitor 102. In alternative embodiments, the modules 104, without any changes, may also be connected to other modules not directly connected to the hub.

The modules 104 may be secured to the hub 110, or other modules or firefighting devices via threaded fasteners 124 or other similar or suitable connecting devices as described herein. In an alternative embodiment, module(s) 104 may be secured directly to a panel mount 250 (FIG. 16) and/or a wireless controller 400 (FIGS. 17-20).

In a preferred embodiment, each module 104 comprises a connector 130 to connect to the hub 110 (and/or a connector to connect to other modules 131).

Wireless Control Upgrade

In one embodiment of the present disclosure, the module 104 may comprise a wireless control transmitter 300. The wireless control transmitter 300 attaches to the hub 110 to provide communication functionality for additional modules 104 and the monitor 102. The wireless control transmitter 300 allows a user to interface with and control the modules 104 and monitor 102 with a separate wireless controller 400. The wireless control transmitter 300 may comprise its own module 104 or alternatively be a component within any of the other modules 104 disclosed herein.

In the existing art, monitors 102 have remote control capabilities. A radio transmitter needs to be connected to and mounted on or near the monitor itself while a wireless handheld controller 400 is used remotely. In order to upgrade other existing products, one must modify existing components and install new components near the monitor. Some products require opening up the sealed electronics enclosures on the monitor and plugging in and mounting an external antenna to achieve wireless capability. Other products require selecting a spot near the monitor and mounting an external receiver. Mounting the receiver typically requires drilling holes or welding a bracket onto the monitor 102.

Figure 10:
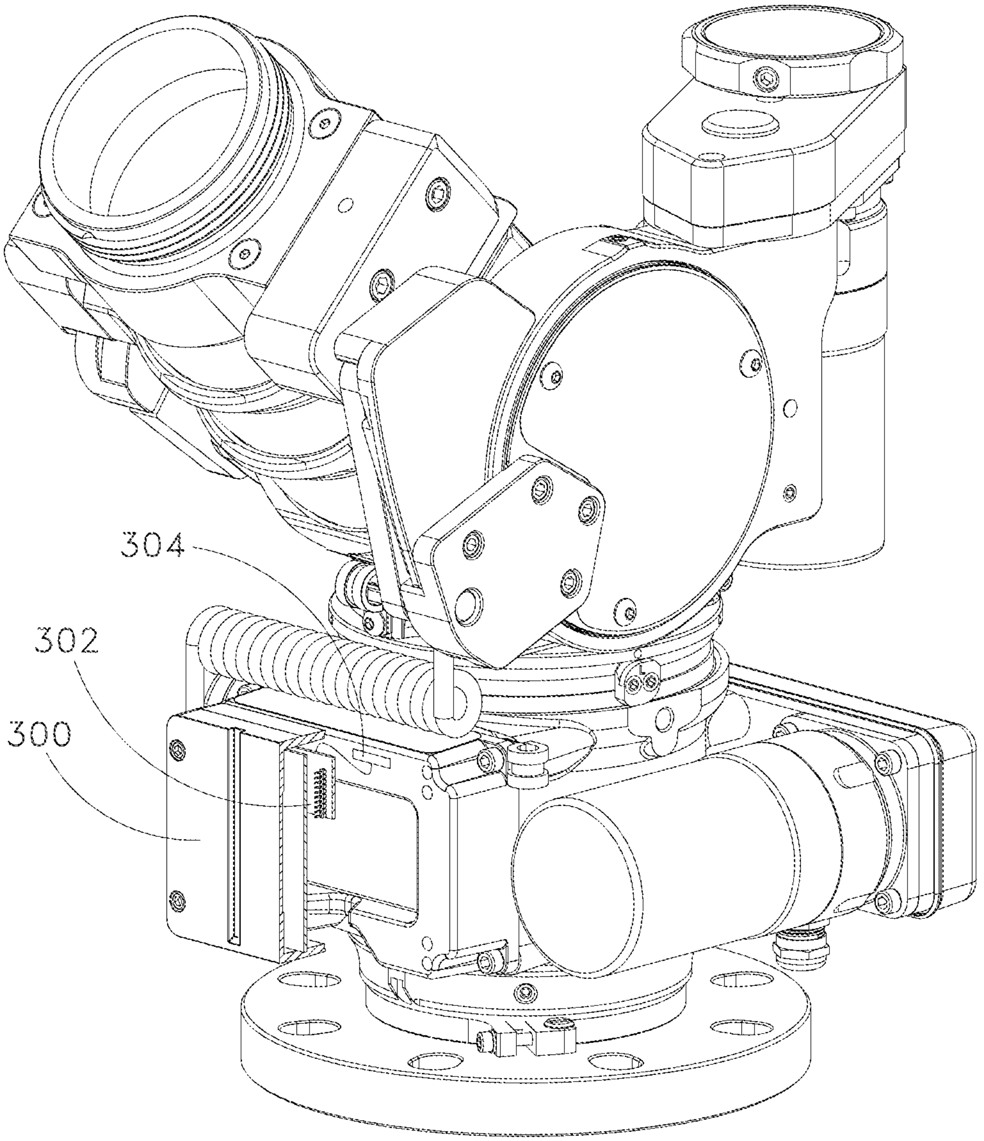
FIG. 10 depicts a connection between a wireless transmitter module, with an internal antenna, and the hub.

The present disclosure remedies these complications by providing a dedicated and standardized mounting location on the monitor 102, i.e., the hub 110, that allows the user to easily plug in the wireless adapter to gain remote control capability of the monitor 102. Specifically, the wireless control transmitter 300 may contain either an internal antenna 304 or an external antenna 306. FIG. 10 depicts a cross section view of the wireless control transmitter 300 which shows the internal antenna 304 and circuit boards 302. Not depicted in FIG. 10 are the corresponding wireless potting and standard off-the-shelf circuitry materials used in connection with standard wireless transmission devices. The internal antenna 304 is located within the wireless control transmitter 300 itself. This permits the wireless control transmitter 300 to be placed in any position in a stack of modules mounted to the hub 110. In an alternative embodiment, the internal antenna 304 may be placed within any of the modules 104 disclosed within this application.

The internal antenna 304 is most effective with short range communication and alternative antennas may be required if a user is seeking longer range communications. The wireless control transmitter 300 may comprise an internal antenna with varying strengths to meet the needs of the user. In some cases, a module having an external antenna may be necessary.

Figure 11:
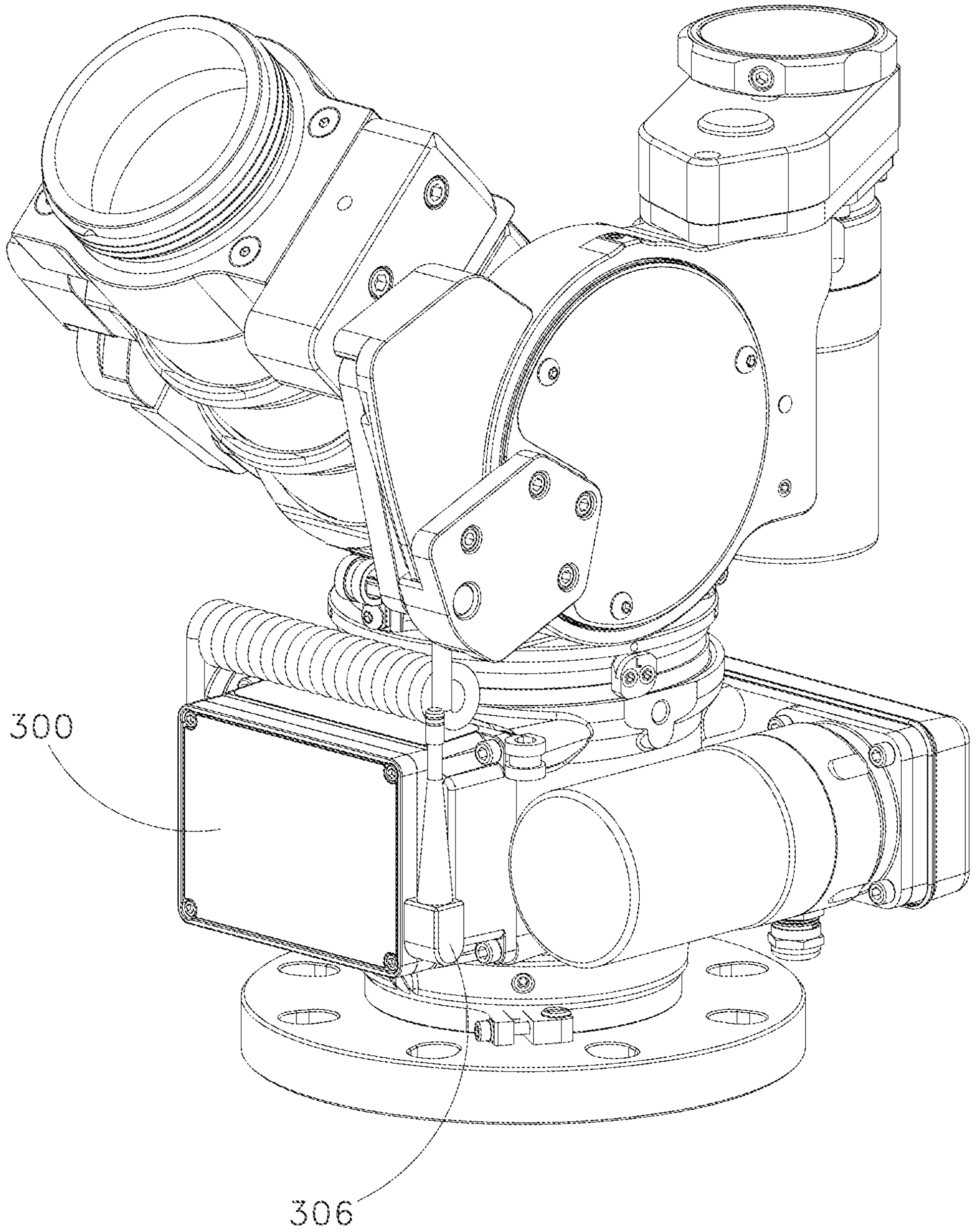
FIG. 11 depicts a connection between a wireless transmitter module, with an external antenna, and the hub.
Figure 12:
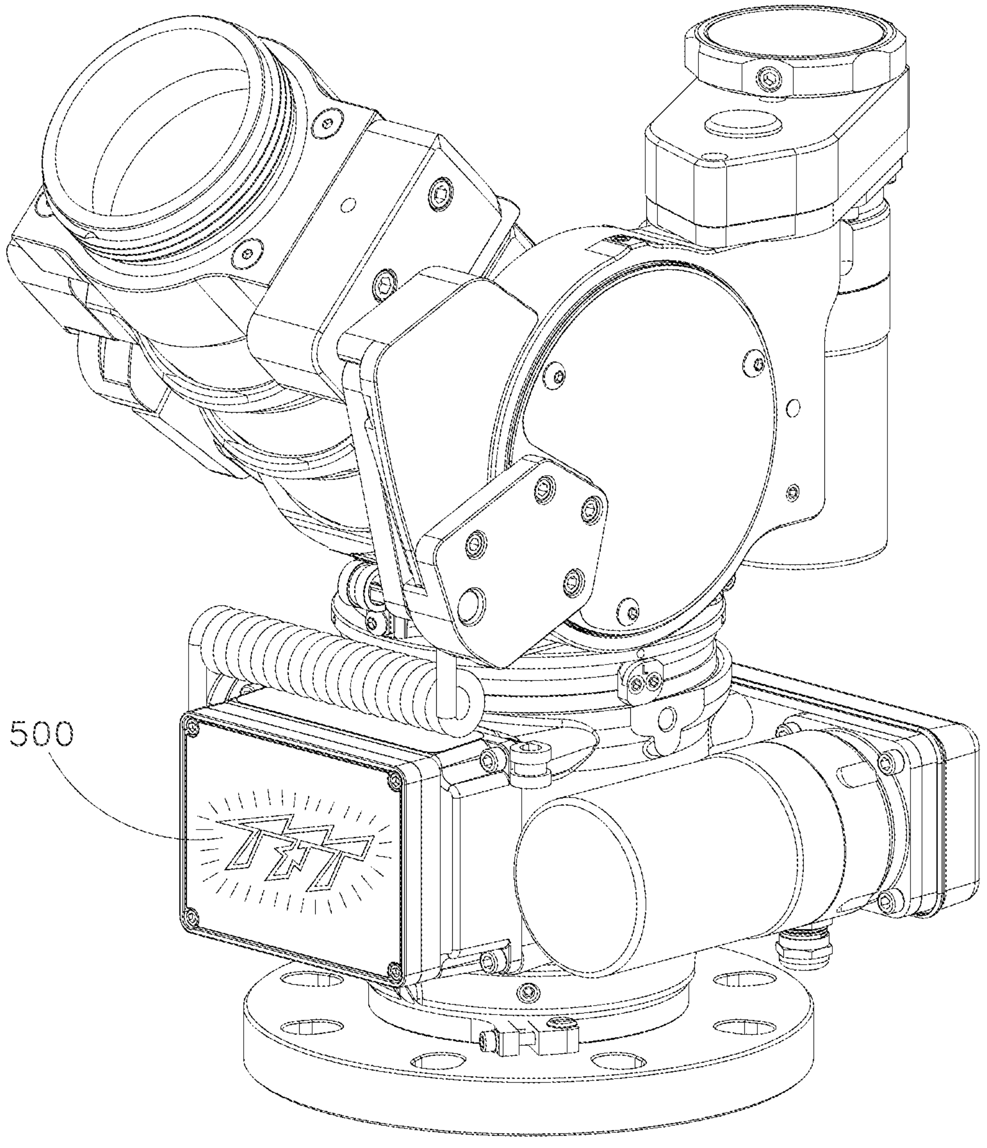
FIG. 12 depicts a connection between a lighting module and the hub.

FIG. 11 depicts a wireless control transmitter 300 having an external antenna 306. In the embodiment shown in FIG. 11, the external antenna 306 is located along the side of the wireless control transmitter 300 proximate the side wall 114 of the hub 110. This permits the wireless control transmitter 300 to be placed in any position within a stack of modules mounted to the hub 110. In an alternative embodiment, the external antenna is located anywhere along the outer surface of the wireless control transmitter 300.

In an alternative embodiment, the wireless control transmitter 300 comprises a remote transmitter module with a different strength antenna, to allow for long-range communication. Other embodiments to increase the signal range are also considered.

Lighting Module

In one embodiment of the present disclosure, the module 104 may comprise a lighting module 500 that include an illumination source disposed therein to display or emit light therefrom in response to a variety of inputs, instructions, data, etc. The lighting module 500 may function, for example, as a status indicator light and/or customizable indicia. The lighting module 500 may include the functionality to create different colors and flashing patterns to signify status conditions or merely for cosmetic effect. The lighting module 500 may be customized to a certain shape or display a certain insignia. In an embodiment of the present disclosure, the lighting module 500 may also project light from the module itself to illuminate the module and monitor.

In a preferred embodiment, the lighting module 500 is powered by the hub 110 via a connector 130 or another module via 131. In an alternative embodiment, the lighting module 500 is powered by batteries, the monitor 102, or an additional module 104, such as the power transfer module 600.

Power Transfer Module

In one embodiment of the present disclosure, the module 104 comprises a power transfer module 600. As shown in FIG. 9, the power transfer module 600 connects to the hub 110 via connector 130 or to another module via 131. As with all other modules 104, the modules receive power from the hub 110. The hub 110 receives power from an external power source, such as, for example only, a battery, power supply, generator, fire truck, electric vehicle, etc. The power transfer module 600 functions as a power distribution center capable of increasing or decreasing voltage output from the module 600. The power transfer module 600 contains different power output adapters, such as a standard three-prong outlet receiver 602, a USB receiver 604, or the like. This allows multiple different devices to run off the power already flowing through the monitor. Additionally, the power transfer module 600 may provide power for additional modules 104. The power transfer module may be connected to other modules via connection 131 and added to the hub 110 in any order. FIG. 13 illustrated power receptacles disposed on an outside perimeter of the module 104 which allows this module 104 to be put in any order and still provide access to the power receptacles.

In addition to power transfer, the power transfer module 600 may also function as a data transfer port.

Screen Display Module

In one embodiment of the present disclosure, the module 104 comprises a screen display module 700 that may display monitor 102 position or other operating conditions, including with respect to any other modules. In an embodiment, the screen display may function as a touch screen interface for the user to control the monitor 102 or change the settings of the monitor 102.

Controller Interface Module

In one embodiment of the present disclosure, the module 104 may comprise a controller interface module 200. The controller interface module 200 may connect directly or indirectly (in combination with any of the other modules) to the hub 110.

In the existing art, most monitors are controlled from a distance with a wireless handheld controller or a fixed mounted panel controller at or on the monitor. In an embodiment of the present disclosure, the controller interface module 200 connects directly or indirectly (in combination with any of the other modules) to the hub 110 and gives the user direct control over the monitor 102 (a "Monitor Mount"). The controller interface module 200 may include programmable buttons, such as, for example, a one-axis nozzle stream control, and a two-axis monitor membrane joystick to operate the monitor 102, and other functionality as may be desirable related to operation of the monitor 102 or other modules 104. In alternative embodiments, the controller interface module 200 is usable in different configurations when not connected to the hub 110 directly. For instance, the controller interface module 200 may be mounted on a wireless handheld device 400 or elsewhere on a firetruck.

Figure 16:
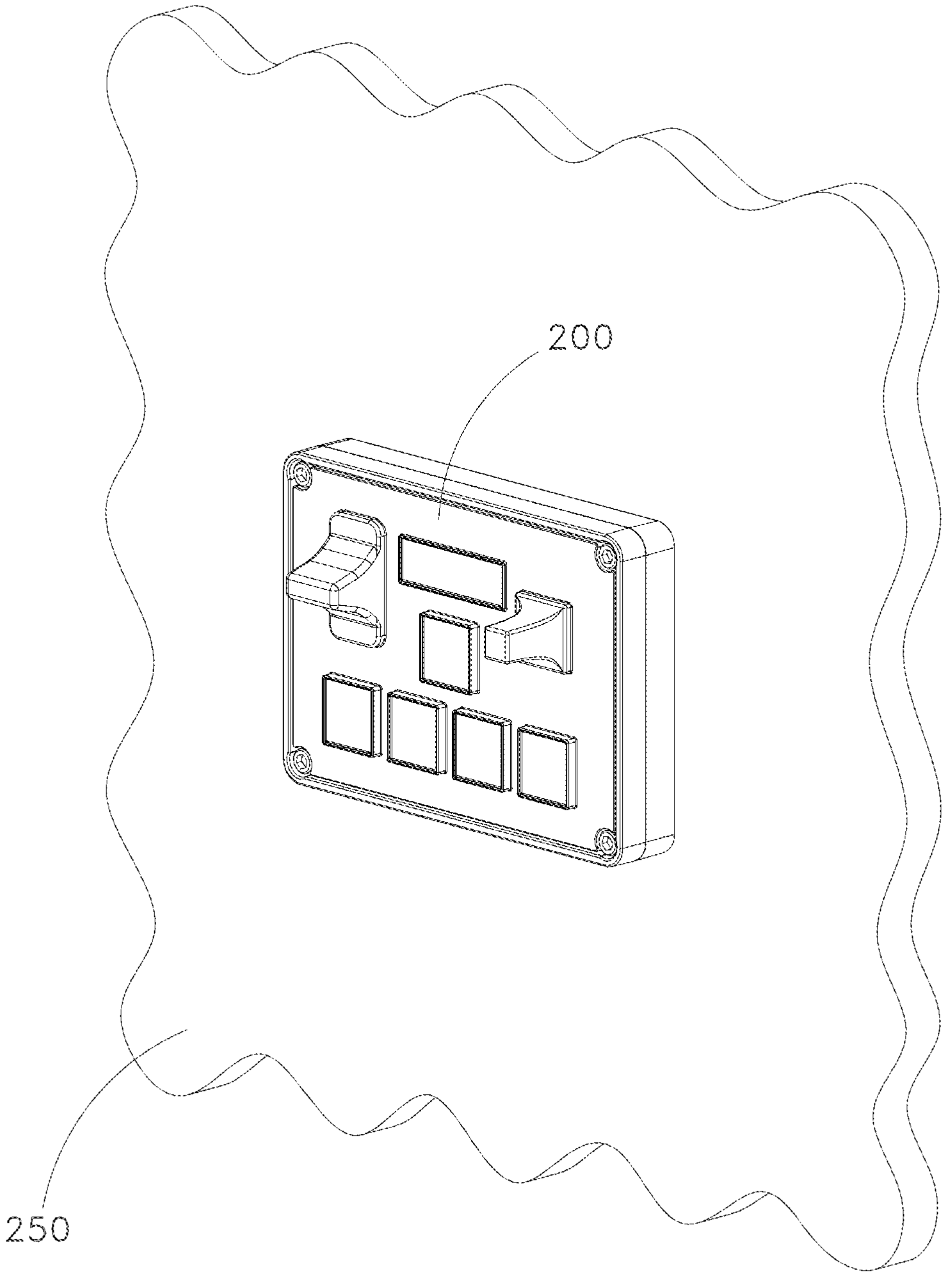
FIG. 16 depicts a front perspective view of a module installed on a panel mount.
Figure 17:
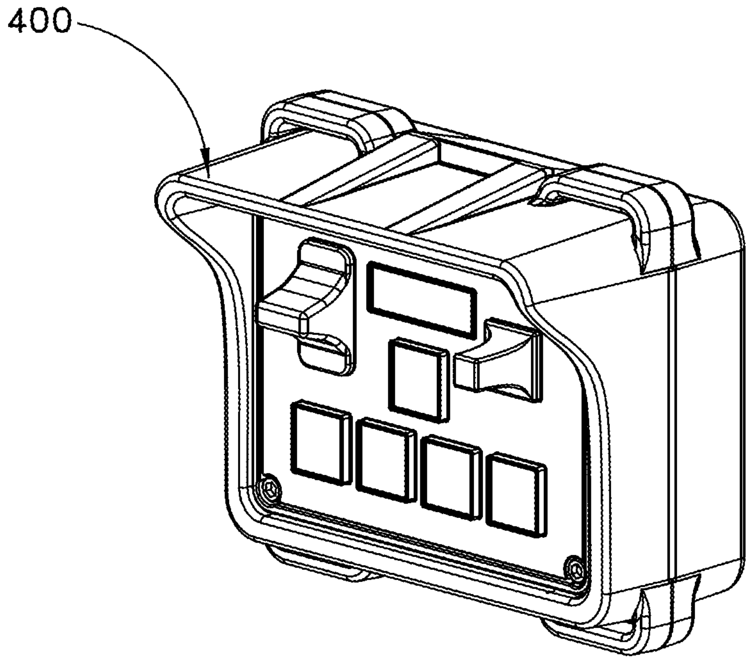
FIG. 17 depicts a front perspective view of a wireless handheld controller used to control a monitor.
Figure 18:
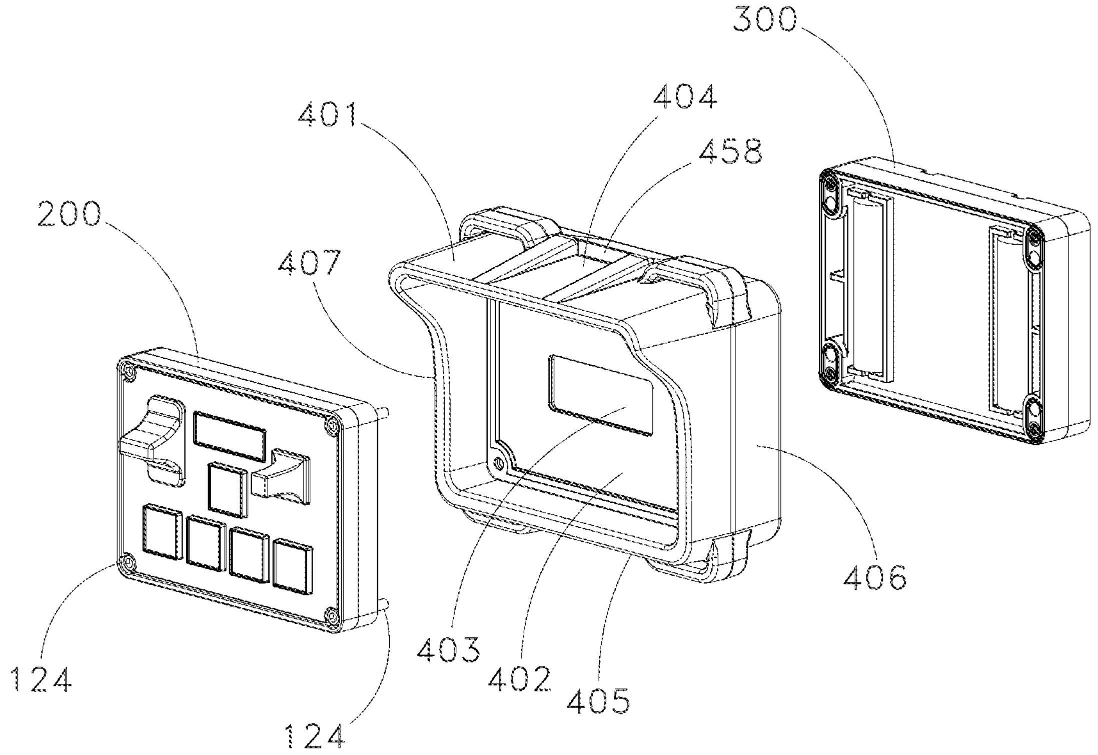
FIG. 18 depicts an exploded view of the wireless handheld controller of FIG. 17 and its corresponding modules.
Figure 19:
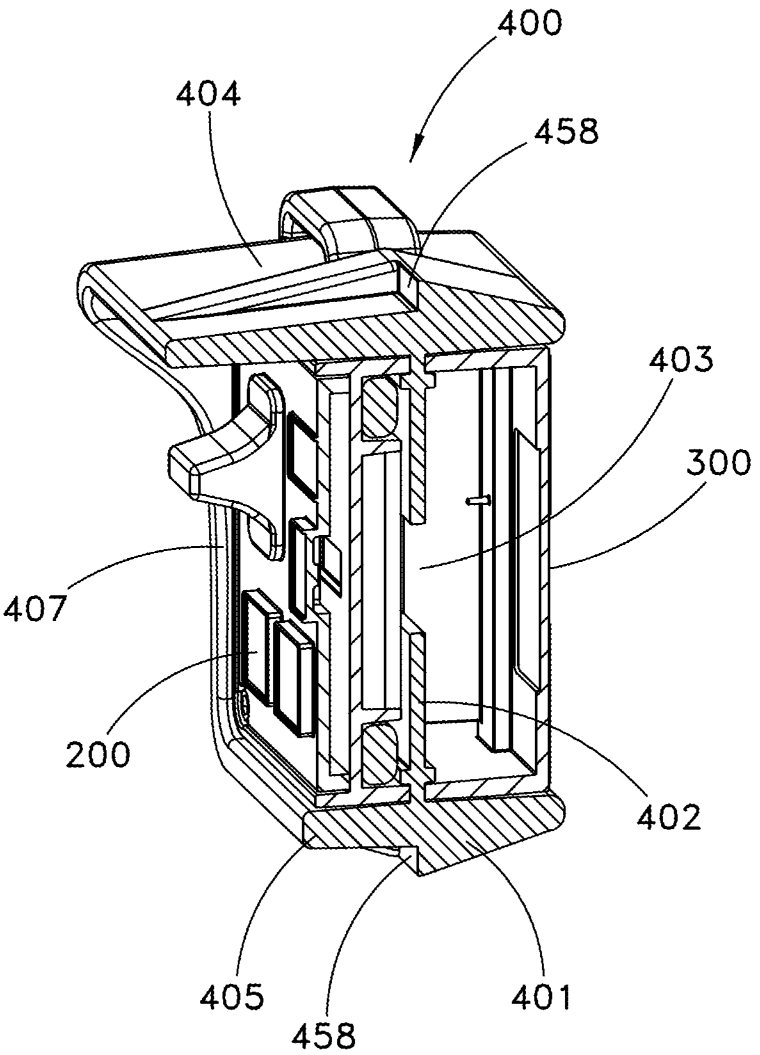
FIG. 19 depicts a cross-sectional view of the wireless handheld controller of FIG. 17.
Figure 20:
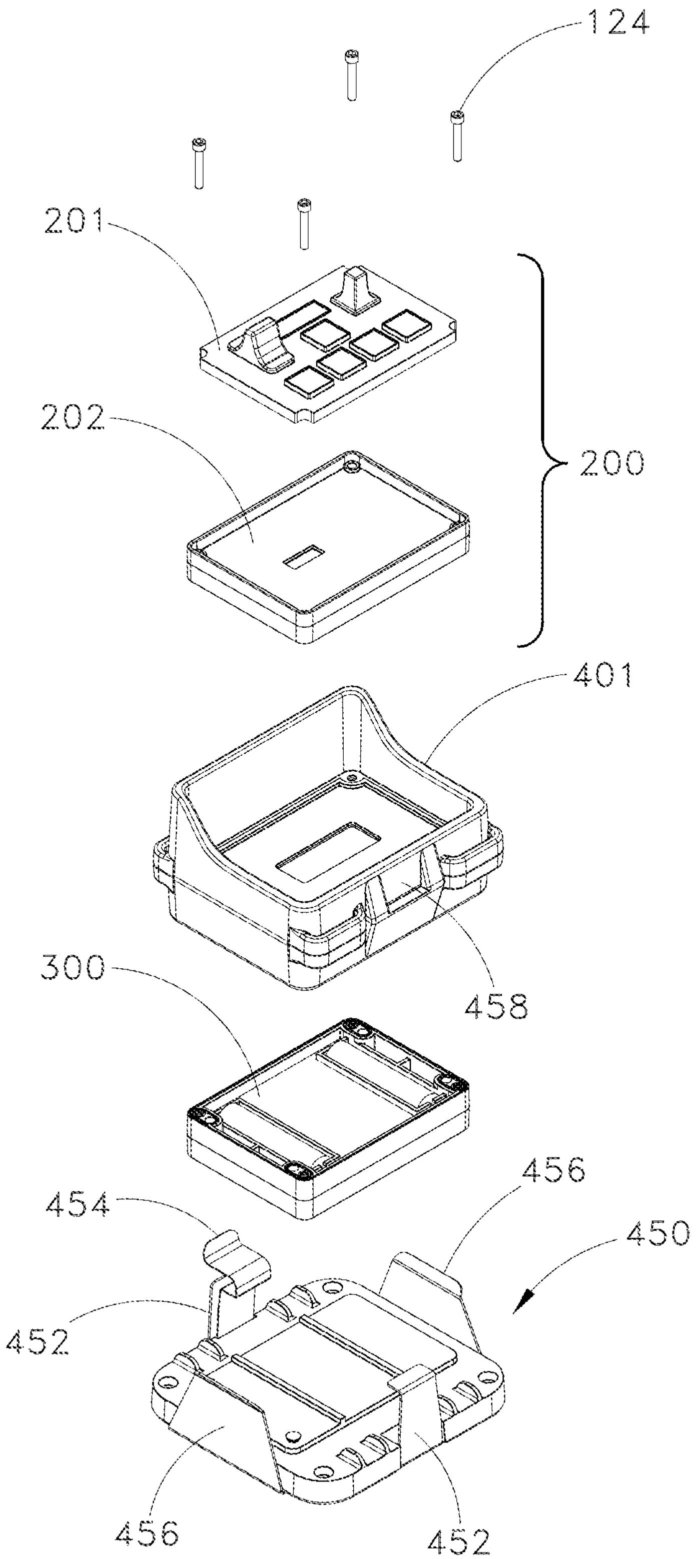
FIG. 20 depicts an exploded view of the wireless handheld controller of FIG. 17.

In an embodiment, the controller interface module 200 is attached to a panel of a firetruck, on the ladder of a firetruck, or another location accessible by a user 250 (a "Panel Mount"). As shown in FIG. 16, the controller interface module 200 is mounted to the panel 250 of a firetruck or other firefighting vehicle, for example. In a preferred embodiment, the controller interface module 200 is connected to the panel 250 via fasteners or a snap-fit connection. The panel 250 comprises an opening to house cables and power components for the controller interface module 200 in order to facilitate connection similar to connector 130. In an alternative embodiment, any of the modules 104 described herein may be connected to the Panel Mount 250.

In another embodiment, the Panel Mount comprises its own hub and the controller interface module 200 connects directly or indirectly to said hub and gives the user direct control over the monitor 102.

In an embodiment, the controller interface module 200 is combined with the wireless transmitter module 300 to form a wireless handheld device 400. The wireless handheld device 400 may include the controller interface module 200, a bumper 401, and a wireless transmitter module 300. The bumper 401 may include a divider 402 which is sandwiched between the controller interface module 200 and the wireless transmitter module 300. In an embodiment, the divider 402 may comprise a cutout portion 403 to facilitate a connection between the interface module 200 and wireless transmitter module 300. When sandwiched together, the bumper 401 acts as a gasket to seal the components of the wireless handheld device 400.

The bumper 401 comprises a top wall 404, a bottom wall 405, and two side walls 406,407 which extend beyond the surfaces of the controller interface module 200 and wireless transmitter module 300. In an embodiment, the top wall 404 protrudes an additional length further than the bottom wall 405 and side walls 406,407 to form an overhang above the controller interface module 200.

The bumper 401 serves as a form of protection for the modules 200, 300. In an alternative embodiment, the bumper 401 comprises an integrated visor to protect controls on the controller interface module 200. In addition, the bumper 401 may include a grip to prevent slipping.

The wireless handheld device 400 may further include a membrane 201, a lower core (comprising a power and RF board and rechargeable batteries) 402, and a charging dock 450. In a preferred embodiment, the controller interface module 200 may include the membrane 201 and the controller module housing 202. The controller interface module 200 may include user controls, LED lights, and a control circuit board. The module 200 may either be integrated within a 104 module, or constitute a separate component for the wireless handheld device 400. The lower core may also be integrated into an existing 104 module or be a separate component for the wireless handheld device 400. The charging dock 450 provides a location where the controller can be placed to recharge the batteries within the wireless handheld device 400. The charging dock 450 may also include a pair of opposed latching arms 452 that each engage a receptacle or ledge 458 defined or formed in opposed sides of the bumper 401 in order to retain the wireless handheld device in place when charging. Preferably, at least one of the latching arms 452 includes a release lever 454 that extends from the latching arm 452 in order to facilitate ease of removal by a user. The latching arm 452 and receptacle 458 engagement is configured to withstand loads of up to nine times gravity and maintain the wireless handheld device 400 within the charging dock 450. The charging dock 450 may also include opposed alignment arms 456 disposed normal to the latching arms 452 on the charging dock 450 that assist insertion of the wireless handheld device 400 into the charging dock 450 in the optimal position to maximize the efficiency of wireless charging.

In an alternative embodiment, the wireless handheld device 400 is capable of wireless charging. In the alternative embodiment, the wireless handheld device 400 can be wirelessly recharged with nearly any wireless charging device (such as a phone or mobile device wireless charger).

A controller interface module may be installed within each of the Monitor Mount, Panel Mount and wireless handheld device. If the user is located proximate the monitor 102, the user may elect to control the monitor 102 with the Monitor Mount. If the user is located proximate the separate panel 200, the user may elect to control the monitor 102 with the Panel Mount. Alternatively, the user may operate the monitor 102 with the wireless handheld device when within range.

Use of Modules

A user may stack the modules 104 together (i.e., attach a first module to the hub 110 and a second module to the first module) for additional functionality. In addition, the modules 104 may be configured to a set standard, such that all may be installed at any location, such as, for example, on the monitor hub 110, a panel hub 110, a ladder hub 110, a wireless controller 400, and the like.

It is understood that the preceding is merely a detailed description of some examples and embodiments of the present disclosure and that numerous changes to the disclosed embodiments may be made in accordance with the disclosure made herein without departing from the spirit or scope of the disclosure. The preceding description, therefore, is not meant to limit the scope of the disclosure, but to provide sufficient disclosure to allow one of ordinary skill in the art to practice the disclosure without undue burden.

What is claimed is:

1. A firefighting apparatus comprising:

a firefighting monitor including a base having a mounting connection, a conduit, and an interface flange, wherein the interface flange is formed on the conduit;

a hub detachably connected to the interface flange, wherein the hub further comprises:

an interface surface;

a perimeter wall extending from the interface surface;

a front surface defined between the perimeter wall and an inner wall, a front cavity defined by the inner wall, and a notch formed in the perimeter wall and inner wall;

at least one module disposed contiguous with and detachably connected to the front surface of the hub, wherein the at least module includes a first module configured to operate the firefighting monitor, and at least one other module detachably connected to the first module.

2. The apparatus of claim 1, wherein the front cavity is further defined by a depressed surface within the perimeter of the inner wall.

3. The apparatus of claim 2, wherein wiring and cables extending from the first module are disposed within the front cavity.

4. The apparatus of claim 2, wherein the front surface comprises a first plurality of holes and first module comprises a second plurality of holes which correspond to the first plurality of holes and are connected with a plurality of fasteners.

5. The apparatus of claim 1, wherein the first module is one of a wireless control transmitter configured for a user to control the firefighting monitor with a separate wireless controller, and a controller interface module configured for a user to control the firefighting monitor at the hub.

6. The apparatus of claim 5, wherein the at least one other module is a second module, wherein the second module is selected from one of a lighting module, power transfer module, and screen display module.

7. The apparatus of claim 6, wherein the second module is detachably connected to a third module, wherein the third module is selected from one of a wireless control transmitter, lighting module, power transfer module, screen display module, and controller interface module.

8. The apparatus of claim 5, wherein:

the first module attached to the hub is a first wireless transmitter module; and the apparatus further comprises a wireless handheld device comprising:

a controller interface module, a second wireless transmitter module to communicate with the first wireless transmitter module, and a bumper located between and around the sides of the controller interface module and second wireless transmitter module to act as a gasket and seal the components of the wireless handheld device.

9. The apparatus of claim 8, wherein the wireless handheld device further comprises a rechargeable lower core to generate power for the wireless handheld device; and the apparatus further comprises a wireless charging station to recharge the lower core of the wireless handheld device.

10. A system for operating a firefighting device comprising:

a hub detachably connected to a base of the firefighting device, wherein the hub comprises: an interface surface, a perimeter wall extending from the interface surface, a front surface defined between the perimeter wall and an inner wall, a front cavity defined by the inner wall and a notch formed in the perimeter wall and inner wall; and, at least one module detachably connected to the hub, the at least one module including a first module configured to operate the firefighting device, and at least one other module detachably connected to the first module, wherein the first module is disposed contiguous with and detachably connected to the front surface of the hub.

11. The system of claim 10, wherein a wireless controller is operatively connected to the first module of the firefighting device.

12. The system of claim 10, wherein the front surface of the hub comprises a first plurality of holes and the control module comprises a second plurality of holes corresponding to the first plurality of holes which are connected with a plurality of fasteners.

13. The system of claim 10, wherein the at least one other module is a second module selected from one of a lighting module, power transfer module, and screen display module.

14. The system of claim 10, wherein the first module is a wireless control transmitter module configured for a user to control the firefighting monitor with a separate wireless controller.

15. The system of claim 14, wherein the wireless controller comprises a controller interface module, a second wireless transmitter module, and a bumper located partially between and extending around the sides of the controller interface module and second wireless transmitter module, wherein any components, wires, or cables are disposed within the bumper.

16. The system of claim 15, wherein the wireless controller and firefighting device are operatively connected by the first and second wireless transmitter modules.

17. The system of claim 10, wherein the firefighting device is a firefighting monitor.

18. A wireless controller device constructed of interchangeable modules comprising:

a controller interface module for operating a firefighter monitor, a wireless transmitter module, a lower core module detachably connected to one of the controller interface module and wireless transmitter module, and a bumper located partially between the controller interface module and the wireless transmitter module, the bumper further comprising:

a front side detachably connected to the controller interface module, a back side detachably connected to the wireless transmitter module, a divider located partially between the front and back sides and comprised of a top, bottom, right, and left sides, the divider having a hole in the proximate the center of the divider, a front and back perimeter wall extending in both perpendicular directions from the divider, wherein the wall proximate the front side of the bumper and extending from the top side of the divider forms an overhang which protrudes beyond the front surface of the controller interface module.

* * * * *